United States Patent
Summa et al.

(10) Patent No.: US 9,275,485 B2
(45) Date of Patent: Mar. 1, 2016

(54) SEAM NETWORK PROCESSING FOR PANORAMA WEAVING

(71) Applicants: Brian Summa, Salt Lake City, UT (US); Valerio Pascucci, Salt Lake City, UT (US); Julien Tierny, Paris (FR)

(72) Inventors: Brian Summa, Salt Lake City, UT (US); Valerio Pascucci, Salt Lake City, UT (US); Julien Tierny, Paris (FR)

(73) Assignees: The University of Utah Research Foundation, Salt Lake City, UT (US); Centre National de la Recherche Scientifique, Paris (FR)

( * ) Notice: Subject to any disclaimer, the term of this patent is extended or adjusted under 35 U.S.C. 154(b) by 253 days.

(21) Appl. No.: 13/929,952

(22) Filed: Jun. 28, 2013

(65) Prior Publication Data

US 2014/0002488 A1 Jan. 2, 2014

Related U.S. Application Data

(60) Provisional application No. 61/665,424, filed on Jun. 28, 2012.

(51) Int. Cl.
*G06T 11/60* (2006.01)
*G06T 3/40* (2006.01)

(52) U.S. Cl.
CPC .............. *G06T 11/60* (2013.01); *G06T 3/4038* (2013.01)

(58) Field of Classification Search
None
See application file for complete search history.

(56) References Cited

U.S. PATENT DOCUMENTS

| | | | |
|---|---|---|---|
| 6,549,681 B1 | 4/2003 | Takahashi et al. |
| 6,754,379 B2 | 6/2004 | Xiong et al. |
| 7,085,435 B2 | 8/2006 | Takiguchi et al. |
| 7,239,805 B2 | 7/2007 | Uyttendaele et al. |
| 7,366,360 B2 | 4/2008 | Takiguchi et al. |
| 7,388,982 B2 | 6/2008 | Endo et al. |
| 7,460,730 B2 | 12/2008 | Pal et al. |
| 7,515,771 B2 | 4/2009 | Clarke et al. |
| 7,620,909 B2 | 11/2009 | Park et al. |
| 7,778,491 B2 | 8/2010 | Steedly et al. |
| 7,889,948 B2 | 2/2011 | Steedly et al. |
| 8,160,392 B1 | 4/2012 | Chien |
| 8,294,748 B2 | 10/2012 | Stec et al. |
| 2003/0107586 A1 | 6/2003 | Takiguchi et al. |
| 2006/0188175 A1 | 8/2006 | Takiguchi et al. |
| 2006/0257051 A1 | 11/2006 | Zavadsky et al. |

(Continued)

OTHER PUBLICATIONS

Matthew Uyttendaele, Ashley Eden, Richard Szeliski, "Eliminating Ghosting and Exposure Artifacts in Image Mosaics", 2001, IEEE, Computer Vision and Pattern Recognition, 2001, vol. 2, pp. II-509-II-516.*

(Continued)

*Primary Examiner* — Robert Bader
(74) *Attorney, Agent, or Firm* — Bell & Manning, LLC

(57) ABSTRACT

A method of creating an image mosaic is provided. A plurality of image files is read at a computing device. The plurality of image files contains image data defining a plurality of overlapping images. A dual adjacency mesh for an image mosaic is defined based on an arrangement of the plurality of overlapping images. The dual adjacency mesh is defined as a plurality of nodes and edges that connect a pair of the plurality of nodes. A node is defined for each image of the plurality of overlapping images, and an edge is defined when an overlap exists between a pair of images of the plurality of overlapping images. The image mosaic is presented in a display of the computing device. The image mosaic is created from the plurality of overlapping images based on the defined dual adjacency mesh.

20 Claims, 25 Drawing Sheets

(56) References Cited

U.S. PATENT DOCUMENTS

| | | |
|---|---|---|
| 2007/0237420 A1 | 10/2007 | Steedly et al. |
| 2010/0238164 A1 | 9/2010 | Steedly et al. |
| 2011/0141300 A1 | 6/2011 | Stec et al. |
| 2011/0216976 A1 | 9/2011 | Rother et al. |
| 2012/0133639 A1 | 5/2012 | Kopf et al. |
| 2012/0237137 A1 | 9/2012 | Chen |
| 2013/0121619 A1 | 5/2013 | Intwala |
| 2013/0127915 A1 | 5/2013 | Gilra |
| 2014/0002485 A1 | 1/2014 | Summa et al. |

OTHER PUBLICATIONS

Nuno Gracias, Mohammad Mahoor, Shahriar Negandaripour, Arthur Gleason, "Fast image blending using watersheds and graph cuts", Apr. 2, 2009, Elsevier, Image and vision Computing, vol. 27, Issue 5, pp. 597-607.*

Yin Li, Jian Sun, Chi-Keung Tang, Heung-Yeung Shum, "Lazy Snapping", 2004, ACM, ACM Transactions on Graphics (TOG)—Proceedings of ACM SIGGRAPH 2004, vol. 23, Issue 3, pp. 303-308.*

Yingen Xiong, Kari Pulli, "Fast Image Stitching and Editing for Panorama Painting on Mobile Phones", Jun. 18, 2010, IEEE, Computer Vision and Pattern Recognition Workshops (CVPRW), 2010, pp. 47-52.*

Brian Summa, Julien Tierny, Valerio Pascucci, "Panorama Weaving: Fast and Flexible Seam Processing", Jul. 2012, ACM, ACM Transactions on Graphics, vol. 31, No. 4, Article 83.*

Aseem Agarwala, Mira Dontcheva, Maneesh Agrawala, Steven Drucker, Alex Colburn, Brian Curless, David Salesin, Michael Cohen, "Interactive Digital Photomontage", Aug. 2004, ACM, ACM Transactions on Graphics (TOG)—Proceedings of ACM SIGGRAPH 2004, vol. 23 Issue 3, pp. 294-302.*

Non-Final Office Action issued in U.S. Appl. No. 13/535,602, Apr. 18, 2014.

* cited by examiner

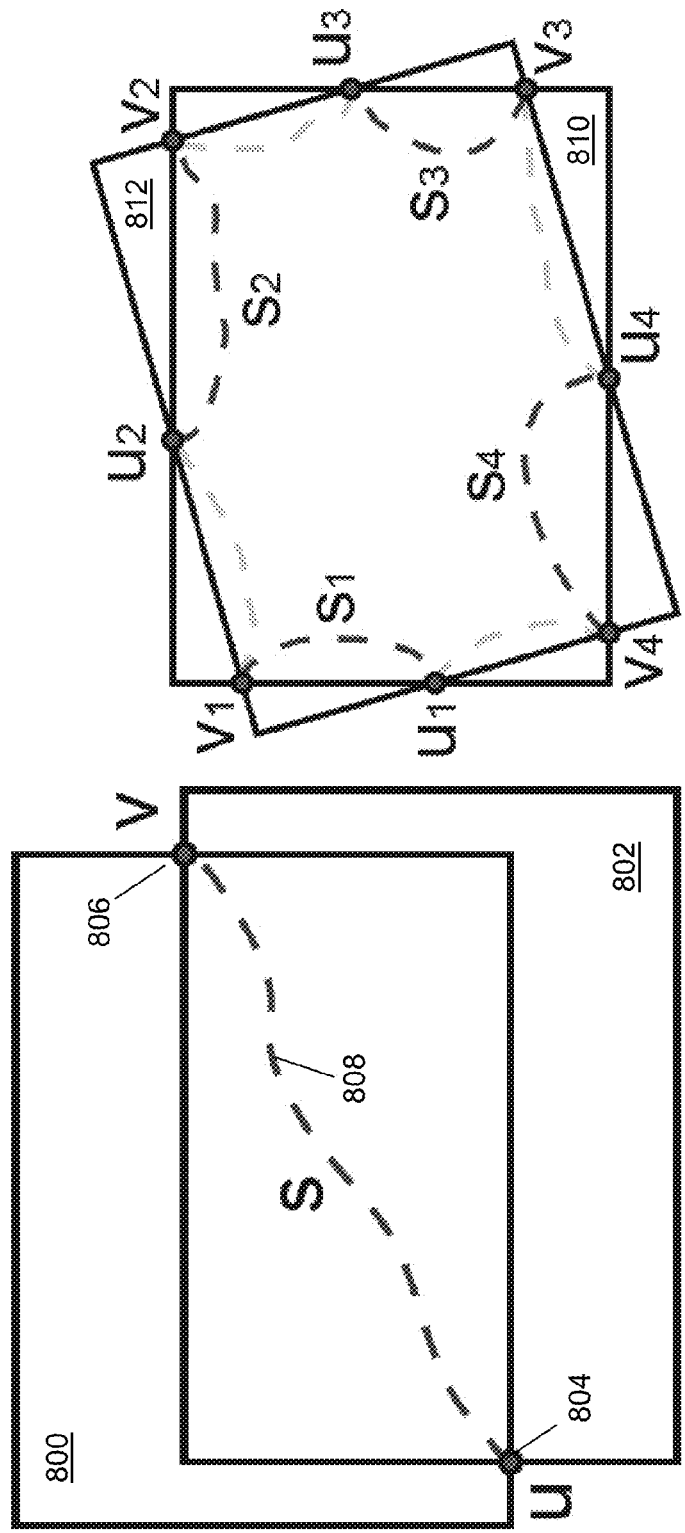

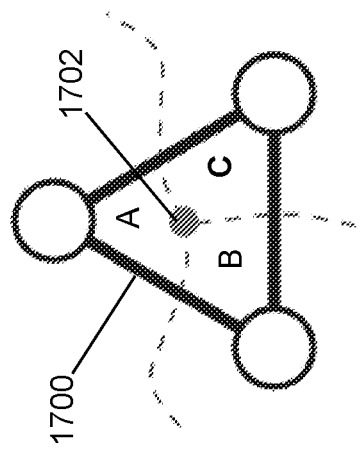
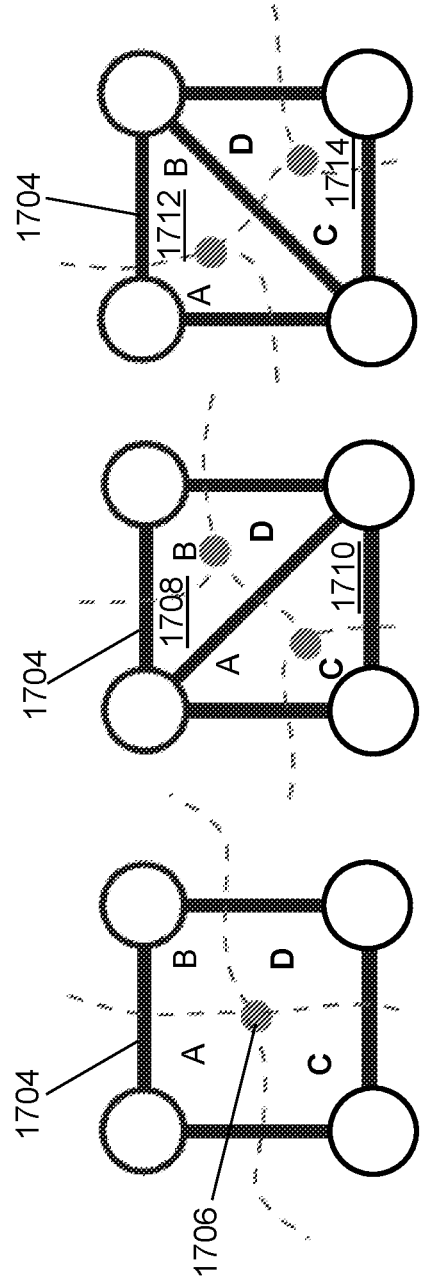
Fig. 17a
Fig. 17b

SEAM NETWORK PROCESSING FOR PANORAMA WEAVING

CROSS-REFERENCE TO RELATED APPLICATIONS

The present application claims priority to U.S. Provisional Patent Application No. 61/665,424 that was filed Jun. 28, 2012, the entire contents of which is hereby incorporated by reference.

BACKGROUND

The composition of panoramas from a collection of smaller individual images has recently become a popular application in digital image processing. With the introduction of low-cost, robotic tripod heads along with the improvement of image registration techniques, panoramas are becoming larger and more complex. In the past, these image collections were captured in one sweeping motion such that image overlaps were in only one dimension. Today's images are often collections of multiple rows and columns, and thus, overlap in two dimensions. Today's images further may be arranged in unstructured configurations. The fully composited panoramic image can range from a few megapixels to many gigapixels in size. As a result, more sophisticated panorama processing techniques continue to be developed to account for their more complex configurations and larger sizes.

A fundamental step in stitching several pictures to form a larger mosaic is the computation of boundary seams that minimize the visual artifacts due to the transition between images. Current seam computation algorithms use optimization methods that may be slow, sequential, memory intensive, and prone to finding suboptimal solutions related to local minima of the chosen energy function. Currently, the most used technique for global seam computation in a panorama is the Graph Cuts algorithm. For reference, see for example, R. Zabih et al., *Fast Approximate Energy Minimization Via Graph Cuts*, Int'l Conference Computer Vision 377-384 (1999); Y. Boykov & V. Kolmogorov, *An Experimental Comparison of Min-cut/Max-Flow Algorithms for Energy Minimization in Vision*, 26 IEEE Transactions on Pattern Analysis and Mach. Intelligence 9, 1124-1137 (2004); and V. Kolmogorov & R. Zabih, *What Energy Functions can be Minimized Via Graph Cuts?*, 26 IEEE Transactions on Pattern Analysis and Mach. Intelligence 2, 147-159 (2004). This is a popular and robust computer vision technique and has been adapted to compute the boundary between a collection of images. While this technique has been used with good success for a variety of panoramic or similar graphics applications, it can be problematic due to its high computational cost and memory requirements. Moreover, Graph Cuts applied to digital panoramas is a serial operation. Additionally, even when the various known techniques perform well, what they compute may not provide perceptually ideal or even good seams between the input images.

SUMMARY

In an example embodiment, a method of creating an image mosaic is provided. A plurality of image files is read at a computing device. The plurality of image files contains image data defining a plurality of overlapping images. A dual adjacency mesh for an image mosaic is defined based on an arrangement of the plurality of overlapping images. The dual adjacency mesh is defined as a plurality of nodes and edges that connect a pair of the plurality of nodes. A node is defined for each image of the plurality of overlapping images, and an edge is defined when an overlap exists between a pair of images of the plurality of overlapping images. The image mosaic is presented in a display of the computing device. The image mosaic is created from the plurality of overlapping images based on the defined dual adjacency mesh.

In another example embodiment, a computer-readable medium is provided having stored thereon computer-readable instructions that when executed by a computing device, cause the computing device to perform the method of creating an image mosaic.

In yet another example embodiment, a system is provided. The system includes, but is not limited to, a display, a processor and a computer-readable medium operably coupled to the processor. The computer-readable medium has instructions stored thereon that when executed by the processor, cause the system to perform the method of creating an image mosaic.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIGS. 8a and 8b illustrate a seam between a pair of images in accordance with an illustrative embodiment.

FIG. 17a illustrates a three image overlap adjacency mesh representation in accordance with an illustrative embodiment.

FIG. 17b illustrates a four image overlap adjacency mesh representation with two valid mesh subdivisions in accordance with an illustrative embodiment.

DETAILED DESCRIPTION

Figure 1:
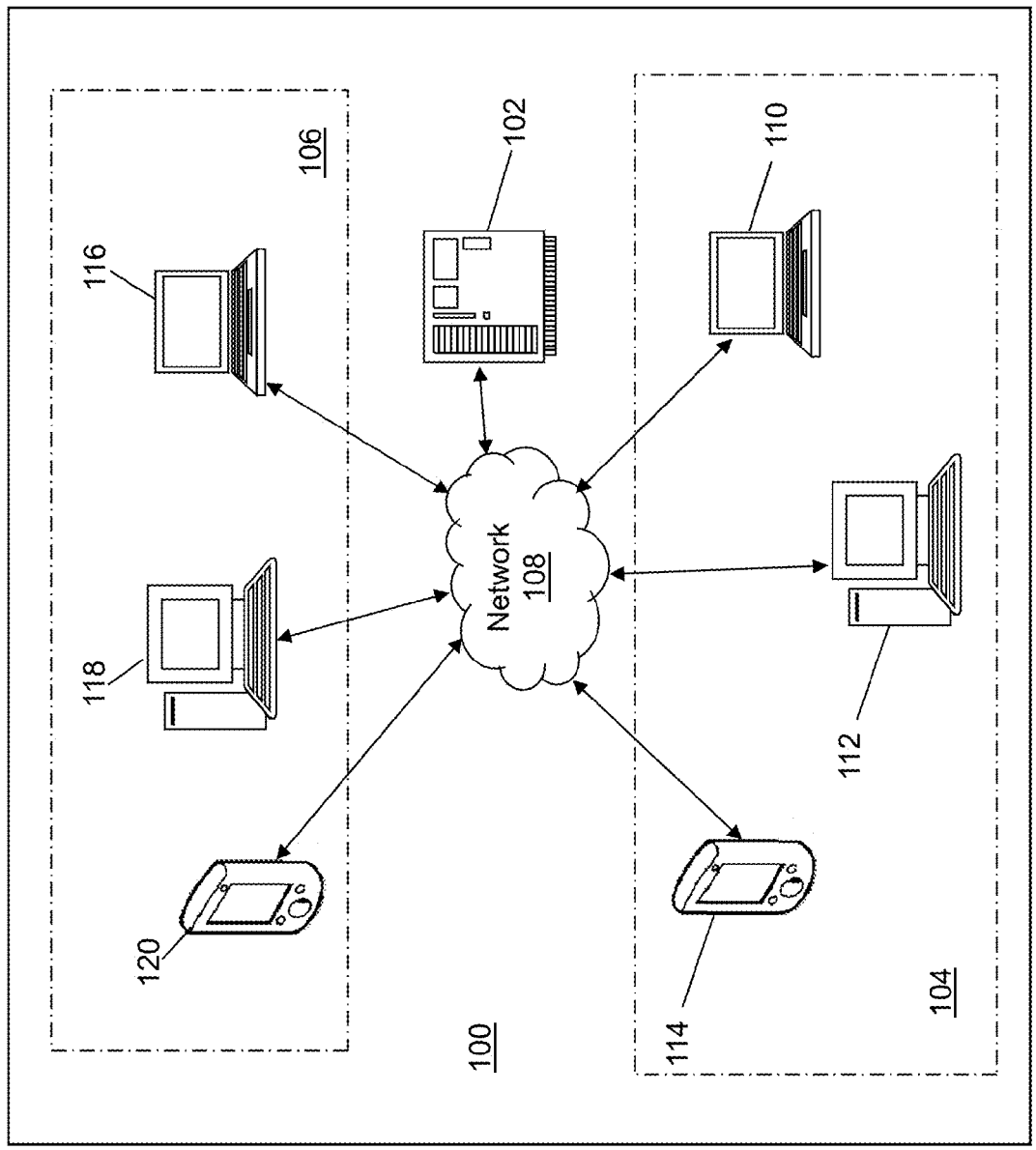
FIG. 1 depicts a block diagram of an image creation and processing system in accordance with an illustrative embodiment.

With reference to FIG. 1, a block diagram of an image creation and processing system 100 is shown in accordance with an illustrative embodiment. In an illustrative embodiment, image creation and processing system 100 may include a data storage system 102, an image processing system 104, a data collection system 106, and a network 108. Data collection system 106 collects data associated with one or more images. Image processing system 104 processes the collected data associated with the one or more images and creates an image mosaic from the collected data that includes seams that stitch the smaller individual images together. Data storage system 102 stores data associated with the one or more images and the image mosaic. An image mosaic, as used herein, is a collection of smaller individual images that are combined to form a single image. In an illustrative embodiment, at least three of the one or more images overlap at one or more pixels in the image mosaic.

The components of image creation and processing system 100 may be included in a single computing device, may be positioned in a single room or adjacent rooms, in a single facility, and/or may be remote from one another. Network 108 may include one or more networks of the same or different types. Network 108 can be any type of wired and/or wireless public or private network including a cellular network, a local area network, a wide area network such as the Internet, etc. Network 108 further may be comprised of sub-networks and consist of any number of devices.

Data storage system 102 may include one or more computing devices. The one or more computing devices send and receive signals through network 108 to/from another of the one or more computing devices of data storage system 102, to/from image processing system 104, and/or to/from data collection system 106. Data storage system 102 can include any number and type of computing devices that may be organized into subnets. Data storage system 102 may communicate with other computing devices using various transmission media that may be wired or wireless as understood by those skilled in the art. Data storage system 102 may communicate information as a peer in a peer-to-peer network using network 108.

Image processing system 104 may include one or more computing devices. The one or more computing devices of image processing system 104 send and receive signals through network 108 to/from another of the one or more computing devices of image processing system 104, to/from data storage system 102, and/or to/from data collection system 106. Image processing system 104 can include any number and type of computing devices that may be organized into subnets. The one or more computing devices of image processing system 104 may include computers of any form factor such as a laptop 110, a desktop 112, a smart phone 114, a personal digital assistant, an integrated messaging device, a tablet computer, etc. Image processing system 104 may include additional types of devices. The one or more computing devices of image processing system 104 may communicate using various transmission media that may be wired or wireless as understood by those skilled in the art. The one or more computing devices of image processing system 104 further may communicate information as peers in a peer-to-peer network using network 108.

Data collection system 106 may include one or more computing devices. The one or more computing devices of data collection system 106 send and receive signals through network 108 to/from another of the one or more computing devices of data collection system 106, to/from data storage system 102, and/or to/from image processing system 104. Data collection system 106 can include any number and type of computing devices that may be organized into subnets. The one or more computing devices of data collection system 106 may include computers of any form factor such as a laptop 116, a desktop 118, a smart phone 120, an integrated messaging device, a personal digital assistant, a tablet computer, etc. Data collection system 106 may include additional types of devices. The one or more computing devices of data collection system 106 may communicate using various transmission media that may be wired or wireless as understood by those skilled in the art. The one or more computing devices of data collection system 106 further may communicate information as peers in a peer-to-peer network using network 108.

Figure 2:
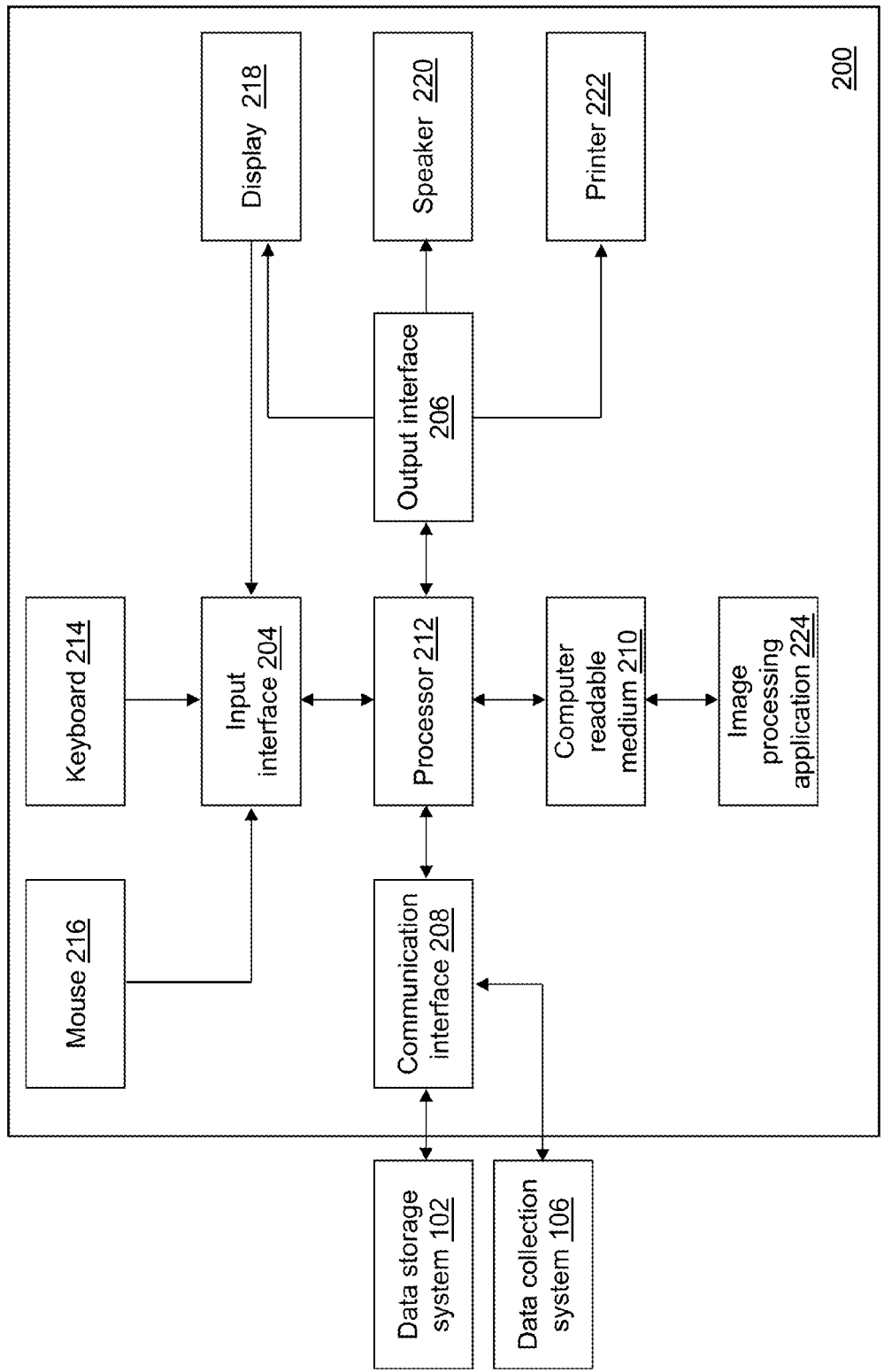
FIG. 2 depicts a block diagram of an image processing device of the image creation and processing system of FIG. 1 in accordance with an illustrative embodiment.

With reference to FIG. 2, a block diagram of an image processing device 200 of image processing system 104 is shown in accordance with an illustrative embodiment. Image processing device 200 is an example computing device of image processing system 104. Image processing device 200 may include an input interface 204, an output interface 206, a communication interface 208, a computer-readable medium 210, a processor 212, a keyboard 214, a mouse 216, a display 218, a speaker 220, a printer 212, and an image processing application 224. Fewer, different, and additional components may be incorporated into image processing device 200.

Input interface 204 provides an interface for receiving information from the user for entry into image processing device 200 as understood by those skilled in the art. Input interface 204 may interface with various input technologies including, but not limited to, keyboard 214, display 218, mouse 216, a track ball, a keypad, one or more buttons, etc. to allow the user to enter information into image processing device 200 or to make selections presented in a user interface displayed on display 218. The same interface may support both input interface 204 and output interface 206. For example, a display comprising a touch screen both allows user input and presents output to the user. Image processing device 200 may have one or more input interfaces that use the same or a different input interface technology. Keyboard 214, display 218, mouse 216, etc. further may be accessible by image processing device 200 through communication interface 208.

Output interface 206 provides an interface for outputting information for review by a user of image processing device 200. For example, output interface 206 may interface with various output technologies including, but not limited to, display 218, speaker 220, printer 222, etc. Display 218 may be a thin film transistor display, a light emitting diode display, a liquid crystal display, or any of a variety of different displays understood by those skilled in the art. Speaker 220 may be any of a variety of speakers as understood by those skilled in the art. Printer 222 may be any of a variety of printers as understood by those skilled in the art. Image processing device 200 may have one or more output interfaces that use the same or a different interface technology. Display 218, speaker 220, printer 222, etc. further may be accessible by image processing device 200 through communication interface 208.

Communication interface 208 provides an interface for receiving and transmitting data between devices using various protocols, transmission technologies, and media as understood by those skilled in the art. Communication interface 208 may support communication using various transmission media that may be wired or wireless. Image processing device 200 may have one or more communication interfaces that use the same or a different communication interface technology. Data and messages may be transferred between image processing system 104 and data storage system 102 and/or data collection system 106 using communication interface 208.

Computer-readable medium 210 is an electronic holding place or storage for information so that the information can be accessed by processor 212 as understood by those skilled in the art. Computer-readable medium 210 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. Image processing device 200 may have one or more computer-readable media that use the same or a different memory media technology. Image processing device 200 also may have one or more drives that support the loading of a memory media such as a CD or DVD.

Processor 212 executes instructions as understood by those skilled in the art. The instructions may be carried out by a special purpose computer, logic circuits, or hardware circuits. Thus, processor 212 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 212 executes an instruction, meaning that it performs/controls the operations called for by that instruction. Processor 212 operably couples with input interface 204, with output interface 206, with computer-readable medium 210, and with communication interface 208 to receive, to send, and to process information. Processor 212 may retrieve a set of instructions from a permanent memory device and copy the instructions in an executable form to a temporary memory device that is generally some form of RAM. Image processing device 200 may include a plurality of processors that use the same or a different processing technology.

Image processing application 224 performs operations associated with creating an image mosaic from one or more images and with editing the created image mosaic based on user interaction with image processing application 224. Some or all of the operations described herein may be embodied in image processing application 224. The operations may be implemented using hardware, firmware, software, or any combination of these methods. With reference to the example embodiment of FIG. 2, image processing application 224 is implemented in software (comprised of computer-readable and/or computer-executable instructions) stored in computer-readable medium 210 and accessible by processor 212 for execution of the instructions that embody the operations of image creation and processing application 224. Image processing application 224 may be written using one or more programming languages, assembly languages, scripting languages, etc.

Image processing application 224 may be implemented as a Web application. For example, image processing application 224 may be configured to receive hypertext transport protocol (HTTP) responses from other computing devices such as those associated with data collection system 106 and/or data storage system 102 and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, or any other type of file supported by HTTP.

Figure 3:
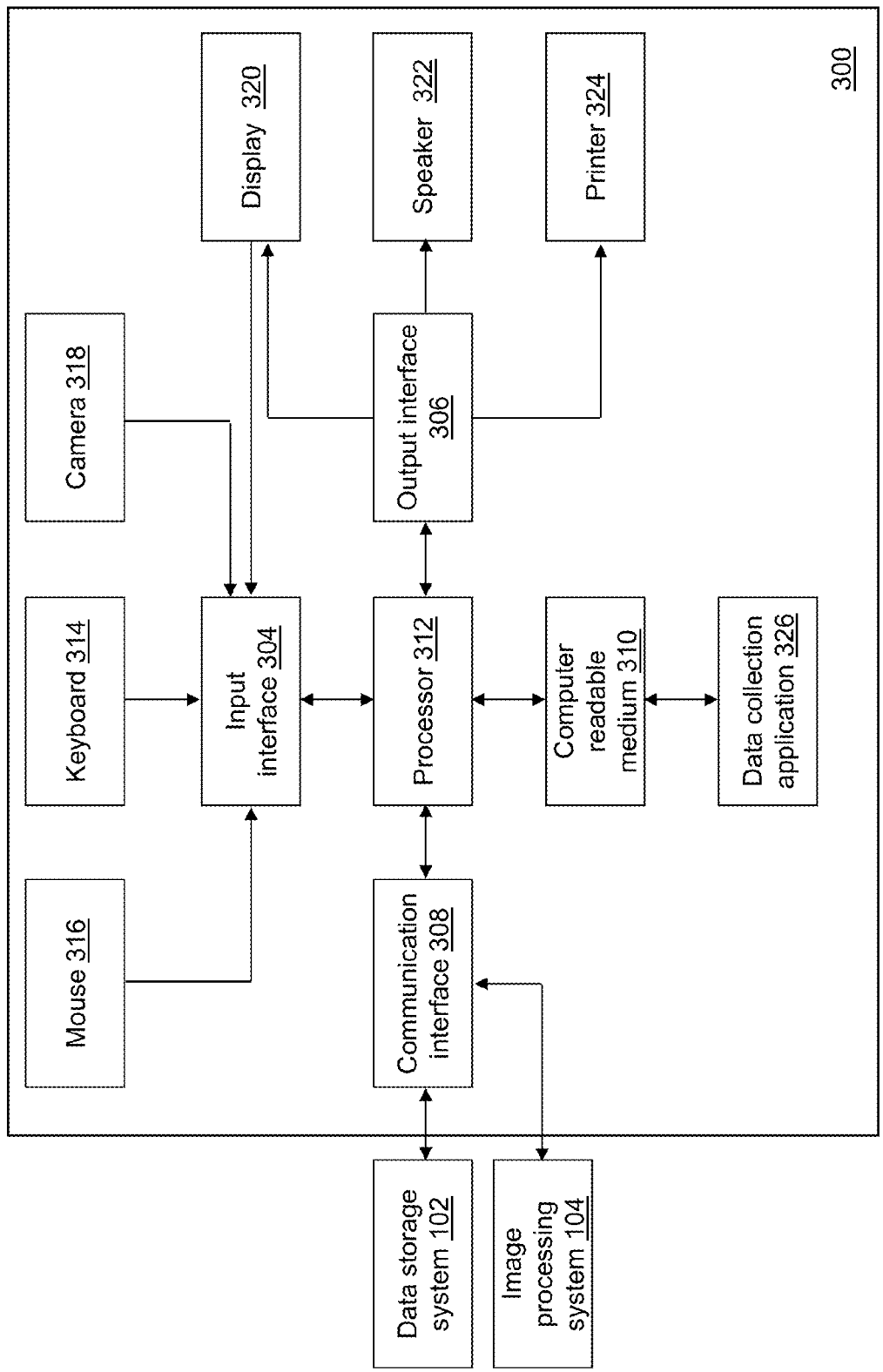
FIG. 3 depicts a block diagram of a data collection device of the image creation and processing system of FIG. 1 in accordance with an illustrative embodiment.

With reference to FIG. 3, a block diagram of a data collection device 300 of data collection system 106 is shown in accordance with an example embodiment. Data collection device 300 is an example computing device of data collection system 106. Data collection device 300 may include a second input interface 304, a second output interface 306, a second communication interface 308, a second computer-readable medium 310, a second processor 312, a second keyboard 314, a second mouse 316, a camera 318, a second display 320, a second speaker 322, a second printer 324, and a data collection application 326. Fewer, different, and additional components may be incorporated into data collection device 300.

Second input interface 304 provides the same or similar functionality as that described with reference to input interface 204 of image processing device 200. Second output interface 306 provides the same or similar functionality as that described with reference to output interface 206 of image processing device 200. Second communication interface 308 provides the same or similar functionality as that described with reference to communication interface 208 of image processing device 200. Second computer-readable medium 310 provides the same or similar functionality as that described with reference to computer-readable medium 210 of image processing device 200. Second processor 312 provides the same or similar functionality as that described with reference to processor 212 of image processing device 200. Second keyboard 314 provides the same or similar functionality as that described with reference to keyboard 214 of image processing device 200. Second mouse 316 provides the same or similar functionality as that described with reference to mouse 216 of image processing device 200. Second display 320 provides the same or similar functionality as that described with reference to display 218 of image processing device 200. Second speaker 322 provides the same or similar functionality as that described with reference to speaker 220 of image processing device 200. Second printer 324 provides the same or similar functionality as that described with reference to printer 222 of image processing device 200.

Camera 318 is configured to record and store image data created based on an image received through a lens of camera 318 as understood by a person of skill in the art. Camera 318 further may be accessible by data collection device 300 through second communication interface 308.

Data collection application 326 performs operations associated with collecting and storing the image data created by camera 318. Some or all of the operations described herein may be embodied in data collection application 326. The operations may be implemented using hardware, firmware, software, or any combination of these methods. With reference to the example embodiment of FIG. 3, data collection application 326 is implemented in software (comprised of computer-readable and/or computer-executable instructions) stored in second computer-readable medium 310 and accessible by second processor 312 for execution of the instructions that embody the operations of data collection application 326. Data collection application 326 may be written using one or more programming languages, assembly languages, scripting languages, etc.

Figure 4:
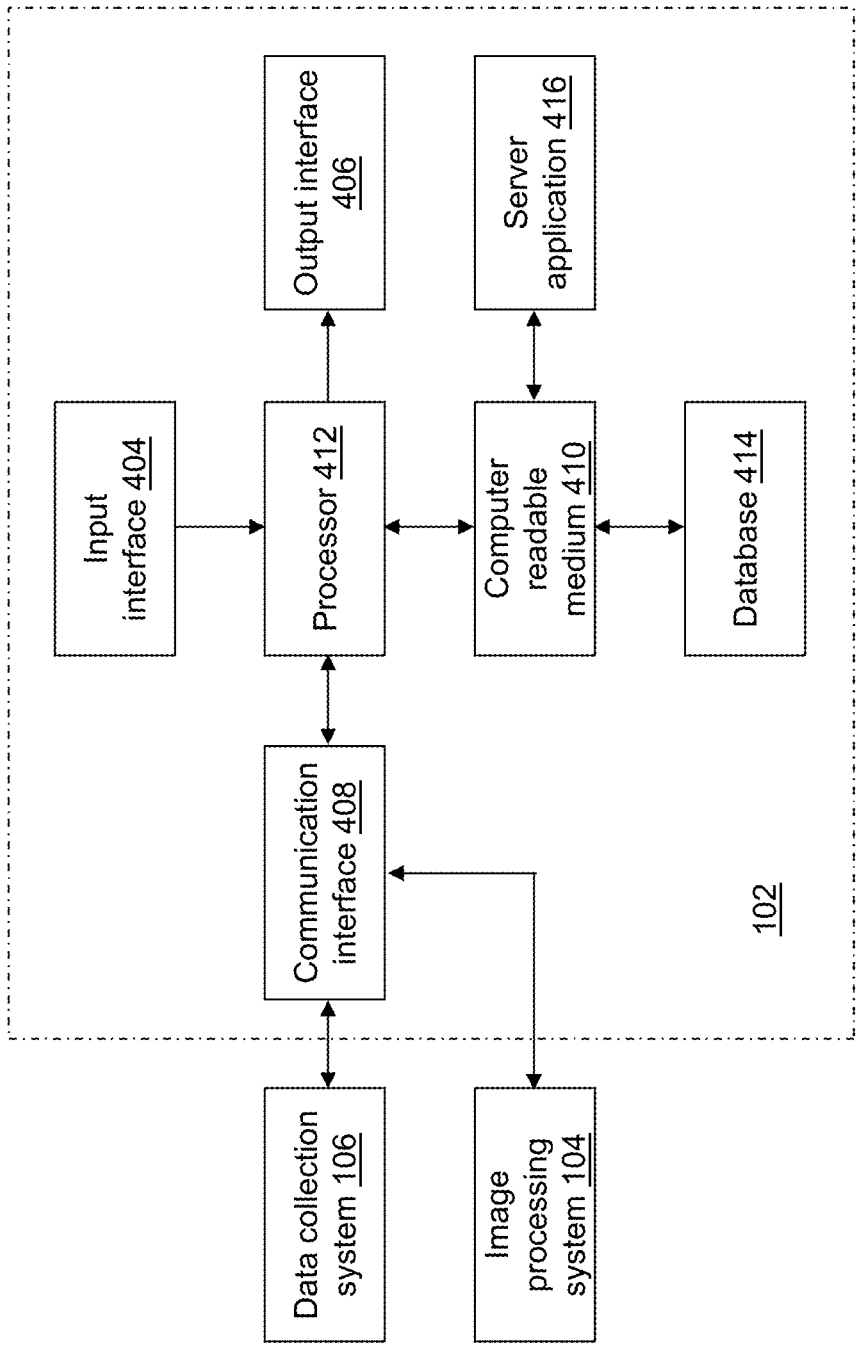
FIG. 4 depicts a block diagram of a data storage system of the image creation and processing system of FIG. 1 in accordance with an illustrative embodiment.

With reference to FIG. 4, a block diagram of data storage system 102 of data collection system 106 is shown in accordance with an illustrative embodiment. Data storage system 102 may include a computer of any form factor. Data storage system 102 may include a third input interface 404, a third output interface 406, a third communication interface 408, a third computer-readable medium 410, a third processor 412, a database 414, and a server application 416. Fewer, different, and additional components may be incorporated into data storage system 102.

Third input interface 404 provides the same or similar functionality as that described with reference to input interface 204 of image processing device 200. Third output interface 406 provides the same or similar functionality as that described with reference to output interface 206 of image processing device 200. Third communication interface 408 provides the same or similar functionality as that described with reference to communication interface 208 of image processing device 200. Third computer-readable medium 410 provides the same or similar functionality as that described with reference to computer-readable medium 210 of image processing device 200. Third processor 412 provides the same or similar functionality as that described with reference to processor 212 of image processing device 200.

Data storage system 102 includes or can access database 414 either through a direct connection or through network 108 using third communication interface 408. Third computer-readable medium 410 may provide the electronic storage medium for database 414. Database 414 is a data repository for image creation and processing system 100. Database 414 may include a plurality of databases that may be organized into multiple database tiers to improve data management and access. Database 414 may utilize various database technologies and a variety of different formats as understood by those skilled in the art including a file system, a relational database, a system of tables, a structured query language database, etc. Database 414 may be implemented as a single database or as multiple databases stored in different storage locations distributed over the Internet or other heterogeneous storage infrastructures.

Server application 416 performs operations associated with accessing database 414 to store or retrieve image data including image data associated with an image mosaic. Some or all of the operations described herein may be embodied in server application 416. The operations may be implemented using hardware, firmware, software, or any combination of these methods. With reference to the example embodiment of FIG. 4, server application 416 is implemented in software (comprised of computer-readable and/or computer-executable instructions) stored in third computer-readable medium 410 and accessible by third processor 412 for execution of the instructions that embody the operations of server application 416. Server application 416 may be written using one or more programming languages, assembly languages, scripting languages, etc.

Server application 416 may be implemented as a Web application. For example, server application 416 may be configured to accept hypertext transport protocol (HTTP) requests from client devices such as those associated with image processing system 104 and data collection system 106 and to send HTTP responses along with optional additional data content which may include web pages such as hypertext markup language (HTML) documents and linked objects in response to the HTTP requests.

Data collection application 326, image processing application 224, and server application 416 may save or store data to database 414 and access or retrieve data from database 414. Data collection application 326, image processing application 224, and server application 416 may be the same or different applications or part of an integrated, distributed application supporting some or all of the same or additional types of functionality as described herein. As an example, the functionality provided by image processing application 224 may be provided as part of an integrated image processing application such as Adobe® Photoshop® offered by Adobe Systems Incorporated and/or image processing applications offered by other software vendors.

In an alternative embodiment, image creation and processing system 100 need not include data storage system 102. For example, database 414 may be stored in computer-readable medium 210 of image processing device 200 or second computer-readable medium 310 of data collection device 300. In another alternative embodiment, image creation and processing system 100 need not include image processing device 200 or data storage system 102. For example, image processing application 224 and server application 416 may be integrated and stored in second computer-readable medium 310 of data collection device 300. Other levels of integration between the components of image creation and processing system 100 may be implemented without limitation as understood by a person of skill in the art. For example, all of the functionality described with reference to image creation and processing system 100 may be implemented in a single computing device.

Figure 5:
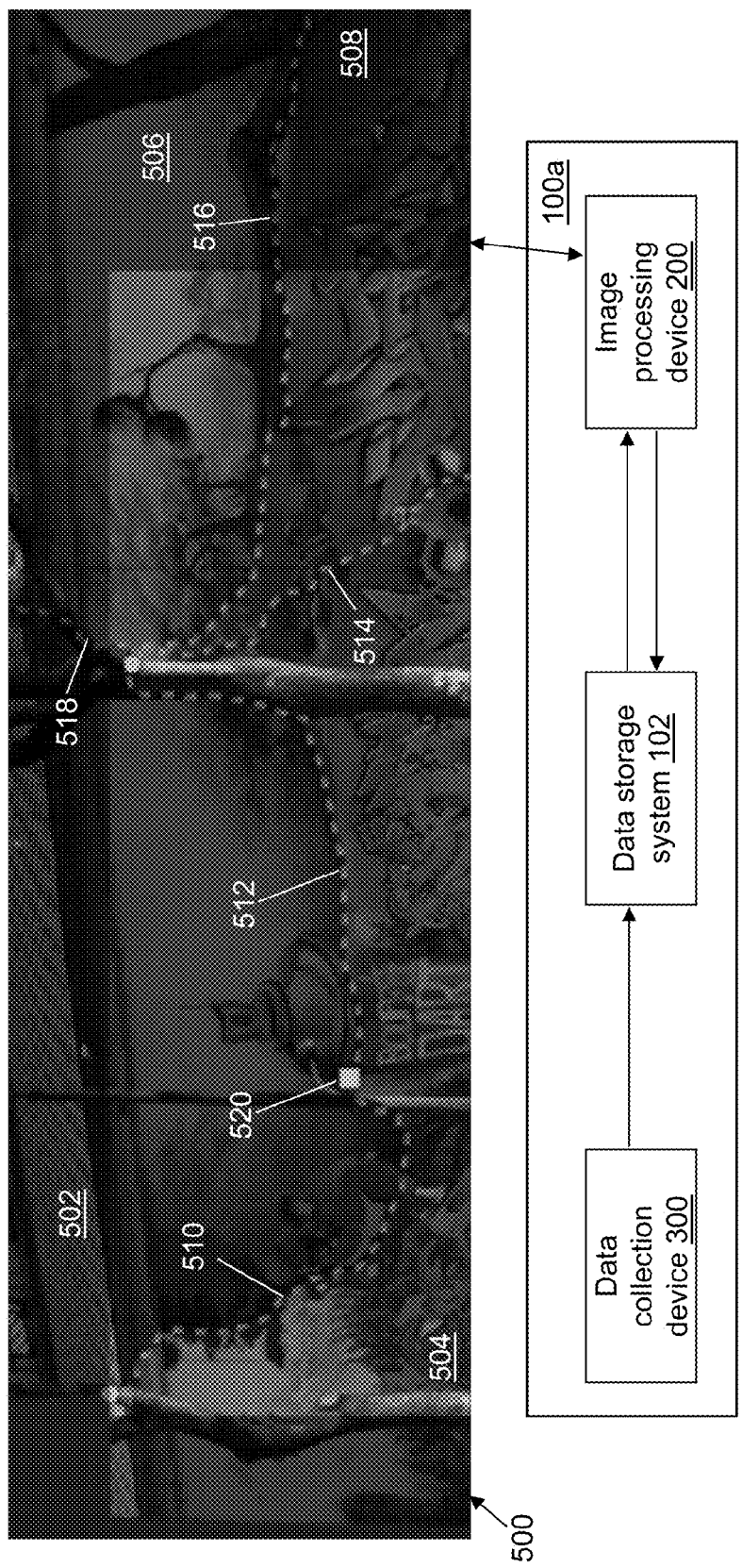
FIG. 5 depicts a block diagram illustrating interactions among the components of the image creation and processing system of FIG. 1 in accordance with an illustrative embodiment.

With reference to FIG. 5, a block diagram illustrating interactions among the components of image creation and processing system 100 is shown in accordance with an illustrative embodiment. A first image creation and processing system 100a may include image processing device 200, data storage system 102, and data collection device 300, which are in communication using network 108 (not shown). Camera 318 is used to capture image data that may be stored locally by data collection device 300. The image data further may be stored remotely to data storage system 102. Image processing device 200 may be used to select all or a subset of the image data stored by data collection device 300 or data storage system 102 for combining into an image mosaic. Data associated with the image mosaic may be stored at data storage system 102 or image processing device 200.

As an example, a first image mosaic 500 is formed by image processing device 200 using a first image 502, a second image 504, a third image 506, and a fourth image 508 captured by data collection device 300. First image 502, second image 504, third image 506, and fourth image 508 are arranged generally to form a 2×2 array of images. A first seam 510 and a second seam 512 form the boundary between first image 502 and second image 504. A third seam 514 forms the boundary between second image 504 and fourth image 508. A fourth seam 516 forms the boundary between third image 506 and fourth image 508. A fifth seam 518 forms the boundary between first image 502 and third image 506.

Figure 6:
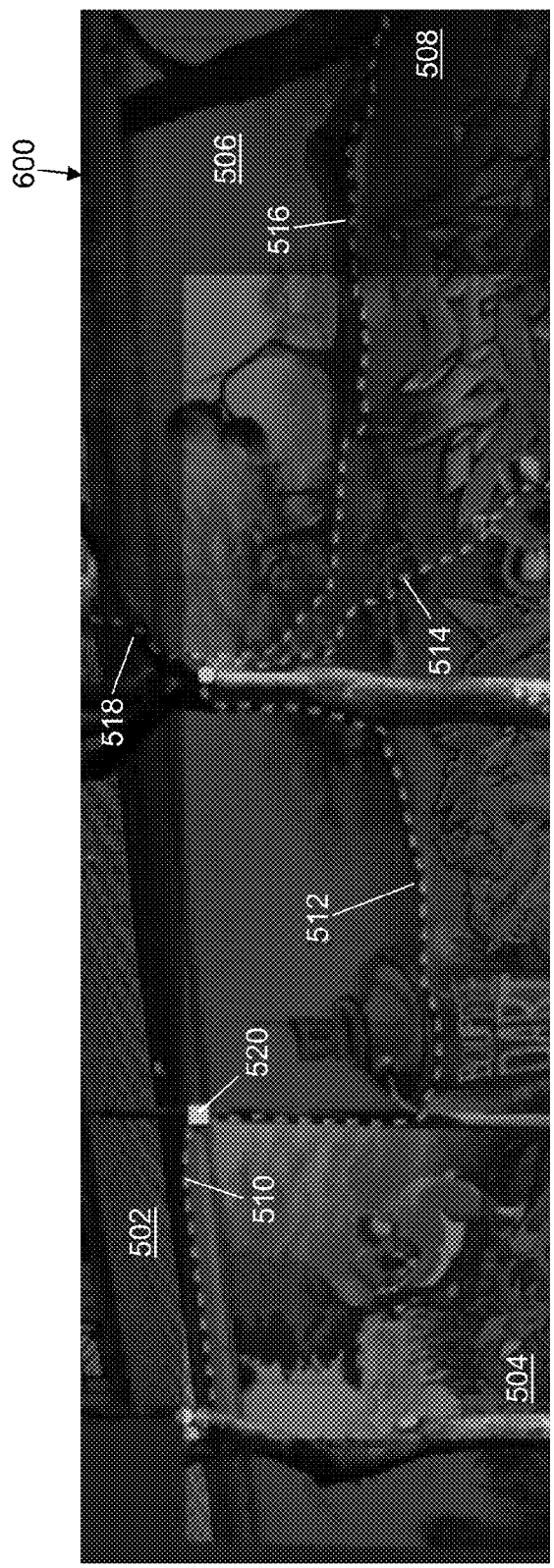
FIG. 6 illustrates use of an image processing application of the image processing computing device of FIG. 2 in accordance with an illustrative embodiment.

A constraint point 520 is defined between first seam 510 and second seam 512 by a user interacting with image processing application 224 of image processing device 200. Constraint point 520 may be dragged between first image 502 and second image 504 by a user so that the user can visualize the effect on first image mosaic 500. For example, with reference to FIG. 6, a second image mosaic 600 is formed by image processing device 200 using first image 502, second image 504, third image 506, and fourth image 508. Second image mosaic 600 shows constraint point 520 at a second position after being dragged and dropped from its first position in FIG. 5 to the second position in FIG. 6 as understood by a person of skill in the art. As a result of the movement of constraint point 520, first seam 510 has been moved to include more of second image 504 and a corresponding less of first image 502.

Figure 7:
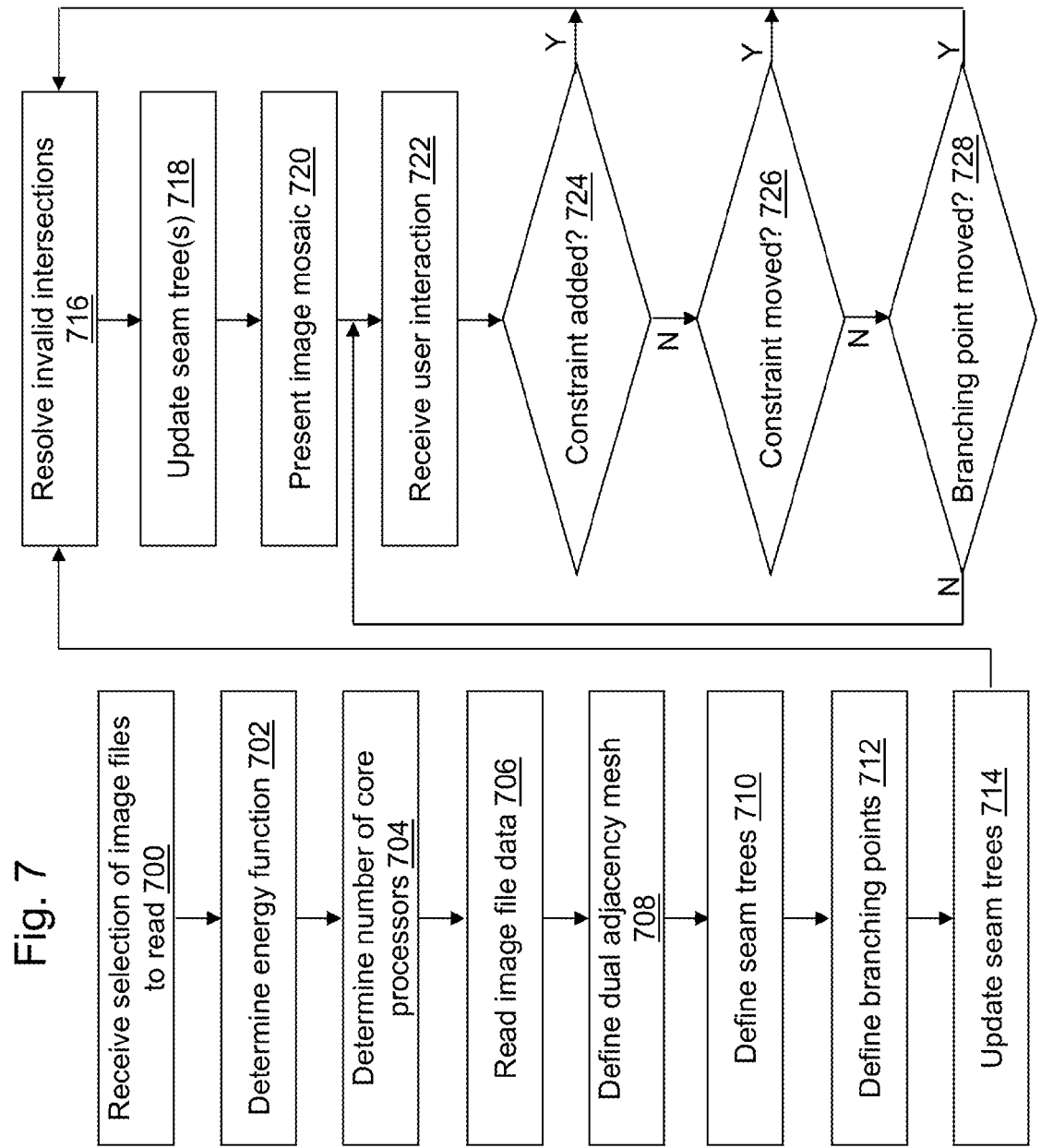
FIG. 7 depicts a flow diagram illustrating example operations performed by the image processing application in accordance with an illustrative embodiment.

With reference to FIG. 7, example operations associated with image processing application 224 are described. Additional, fewer, or different operations may be performed depending on the embodiment. For example, image processing application 224 may provide additional functionality beyond the capability to create an image mosaic and support editing of the created image mosaic by a user. As an example, image processing application 224 may reference functionality provided as part of an integrated image processing application such as those offered by Adobe Systems Incorporated and/or other software vendors.

The order of presentation of the operations of FIG. 7 is not intended to be limiting. A user can interact with one or more user interface windows presented to the user in display 218 under control of image processing application 224 independently or through use of a browser application in an order selectable by the user. Thus, although some of the operational flows are presented in sequence, the various operations may be performed in various repetitions, concurrently, and/or in other orders than those that are illustrated. For example, a user may execute image processing application 224 which causes presentation of a first user interface window, which may include a plurality of menus and selectors such as drop down menus, buttons, text boxes, hyperlinks, etc. associated with image processing application 224 as understood by a person of skill in the art.

Because of the subjective nature of the image boundaries (seams) within the image mosaic and the possibility of various algorithmic techniques falling into bad local minima, image processing application 224 supports a guided interactive technique for creating an image mosaic so that the user is interjected into the seam boundary problem. Existing alternatives require the manual editing, pixel by pixel, of the individual image boundaries, which is a time-consuming and tedious process where the user relies on perception alone to determine if the manual seam is acceptable. Image processing application 224 allows users to include or remove dynamic elements, to move an image seam out of a possible local minima into a lower error state, to move the seam into a higher error state, but one with more acceptable visual coherency, or to hide an error in a location where the user determines that the error is less noticeable. During the edits, the user is provided the optimal seams given these new constraints.

In an operation 700, a selection of a plurality of image files to read is received. For example, the user may select the files containing the data for first image 502, second image 504, third image 506, and fourth image 508 from a drop down list or by browsing to a folder containing image data files on image processing device 200, data collection device 300, and/or data storage device 102. In an illustrative embodiment, the selected plurality of image files are flat, post-registered raster images with no geometry except the image offset. Any image data input can be converted into this format. Moreover, this generality supports the easy insertion of the image mosaic editing process into any panorama creation pipeline. Example tools used to form the flat, post-registered raster images include Adobe® Photoshop™ available from Adobe Systems Incorporated, Hugin available through SourceForge.Net®, Kolor Autopano available from Kolor S.A.R.L., Challes-les-Eaux, France, Gigapan® Stitch.Efx™ available from GigaPan Systems, and PTgui available from New House Internet Services B.V., Rotterdam, The Netherlands.

After registration, image mosaics contain areas where pixel values are duplicated where individual images overlap. Thus, determining which picture provides the color for a pixel location is an important step. The simplest approach is an alpha-blend of the overlap areas to achieve a smooth transition between images though other blending techniques are understood by a person of skill in the art. For example, a more sophisticated approach is to compute the optimal boundaries between images using a minimization based on the determined energy function(s).

In an illustrative embodiment, seam trees are calculated based purely on pairwise boundary solutions. This technique is fast and highly parallel and shows a significant speed-up compared to previous work even when run sequentially. Some of the seminal work in the formation of image mosaics assumes that the plurality of images is acquired in a single sweep (either pan, tilt or a combination of the two) of the scene. In such panoramas, only pairwise overlaps of images need to be considered. The pairwise boundaries, which have globally minimal energy, can be computed quickly and exactly using, for example, a min-cut or min-path algorithm. However, these pairwise techniques were thought to not be general enough to handle the many configurations possible in more complex mosaic configurations, for example, image mosaics that include a multi-overlap area. For example, if at least three of the overlapping images overlap at one or more pixels in the image mosaic, a multi-overlap area can be defined. Of course, more than three of the images may overlap in some multi-overlap areas.

In an operation 702, an energy function to use in computing the image mosaic from the selected plurality of image files is determined. The determined energy function may be used on the entire image mosaic, on an individual image formed from a single image file of the plurality of image files, or the overlap between images. Thus, the energy function used may be selectable or definable at multiple levels. The energy function may be defined as a default value that may be changed by the user as understood by a person of skill in the art. As an example, the user may be provided the ability to switch between pixel difference and gradient difference energies or to provide a custom definition of the energy function used. In an illustrative embodiment, if more than one energy function is defined, a simple slider provided by the user interface or via input provided to the system at launch may be used to blend the energy functions applied linearly.

In an operation 704, a number of core processors of image processing device 200 is determined. In an illustrative embodiment, the processing of the image files to form the image mosaic may be parallelized based on the number of core processors. The user may select/enter the number of core processors, a default number of core processors may be defined, image processing application 224 may detect the number of core processors, etc. For example, the default number of core processors may be defined as one, which may result in serial processing.

In an operation 706, the image file data is read from the selected plurality of image files. In an operation 708, a dual adjacency mesh is defined. The dual adjacency mesh is a structure that supports construction of a valid seam network for an image mosaic that includes one or more multi-overlap areas between images. Definition of the dual adjacency mesh is discussed in more detail below after discussion of seam trees and branching points.

In an operation 710, initial seam trees are defined based on the image file data using the determined energy function(s). The initial intersection computation may be computed using the rasterized boundaries. Due to aliasing, many intersections may be identified. If the intersections are contiguous, they may be treated as the same intersection and a representative point chosen. In practice, this choice has been found to affect the seam in only a very small neighborhood (less than 10 pixels around the intersection). Therefore, the minimal point in this group may be selected in terms of the energy. Pairs of intersections that are very close in terms of Euclidean distance (i.e., less than 20 pixels) may be considered to be infinitesimally small seams and ignored.

Parallel computation may be provided using a thread pool equal to the determined number of core processors. Two seam trees are calculated for each seam. The initial dual seam tree computation for each seam can be run trivially in parallel. In an illustrative embodiment, each seam tree is stored as two buffers: a node buffer, which encodes a node distance, and a tree buffer, which encodes the tree itself. The tree buffer encodes the tree with each pixel referencing its parent. The tree buffer can be encoded as a direction in 2 bits (rounded to 1 byte for speed) for a 4 pixel neighborhood. The node distance (single-source-all-paths), using floating point precision, can be encoded using 4 bytes. Thus, in an illustrative embodiment, 5 bytes per pixel may be used to store the seam tree.

In an operation 712, branching points are defined, which correspond to each face of the dual adjacency mesh. So that for each pairwise seam there exists only two endpoints, for each multi-overlap area, an endpoint is adapted into a branching point. Thus, a branching point is an endpoint defined for a multi-overlap area of the image mosaic. In an operation 714, the defined seam trees are updated to adjust any seam trees based on an endpoint that is redefined as a branching point. Since each seam may be computed using a separate energy function, seam-to-seam intersections beyond the branching points are possible. As a result, in an operation 716, any invalid intersections are resolved to maintain consistency. In an operation 718, the updated seam trees may again be updated to adjust the seam trees based on the resolution of any invalid intersections.

In an operation 720, the image mosaic is presented in display 218 with indicators that show the seam locations. For example, first image mosaic 500 is presented to the user with dashed lines indicating the seams between images. In an operation 722, a user interaction with the presented image mosaic is received. For example, a user movement of constraint point 520 may be detected by image processing application 224 as understood by a person of skill in the art.

In an operation 724, a determination is made concerning whether or not the user interaction is to add a constraint to a seam. If the determination is that the user interaction is to add a constraint to a seam, processing continues in operation 716 to resolve invalid intersections and to define a new seam tree in operation 718 as discussed further below. The image mosaic presented in display 218 is updated in operation 720 to reflect the new constraint and resulting new seam location, and processing continues in operation 722 to await another user interaction. If the determination is that the user interaction is not adding a constraint to a seam, processing continues in an operation 726.

In operation 726, a determination is made concerning whether or not the user interaction is to move a constraint in a seam. If the determination is that the user interaction is to move a constraint in a seam, processing continues in operation 716 to resolve invalid intersections and to update one or more seam trees in operation 718 as discussed further below. The image mosaic presented in display 218 is updated in operation 720 to reflect the moved constraint and resulting new seam location, and processing continues in operation 722 to await another user interaction. If the determination is that the user interaction is not moving a constraint in a seam, processing continues in operation 728.

In operation 728, a determination is made concerning whether or not the user interaction is to move a branching point. If the determination is that the user interaction is to move a branching point, processing continues in operation 716 to resolve invalid intersections and to define update one or more seam trees in operation 718 as discussed further below. The image mosaic presented in display 218 is updated in operation 720 to reflect the moved branching point and resulting new seam location(s), and processing continues in operation 722 to await another user interaction. If the determination is that the user interaction is not moving a branching point, processing continues in operation 722 to await a user interaction. Of course, other interactions that may be supported by image processing application 224 are the ability to zoom, pan, tilt, color correct the image, etc.

The adding of a constraint to a seam and its movement may be referred to as a bending interaction. With reference to FIG. 8a, the boundary lines of a first image 800 and a second image 802 intersect at a first point 804 denoted u and at a second point 806 denoted v, which are connected by a seam 808 denoted s. In a more general case, with reference to FIG. 8b, the boundary lines of a third image 810 and a fourth image 812 result in an even number of intersection points. A set of seams can be built by connecting pairs of points with a consistent winding such as $u_1$ to $v_1$, $u_2$ to $v_2$, $u_3$ to $v_3$, and $u_4$ to $v_4$, or vice versa. Given a simple overlap configuration, a seam can be thought of as a path that connects pairs of boundary intersections u and v. Seams computed in this way define a complete partition of the image mosaic space between third image 810 and fourth image 812. In non-simple cases, for example, with co-linear boundary intervals, the same result can be achieved by choosing one representative point that may be optimized to minimize some energy. Each seam $u_1$ to $v_1$, $u_2$ to $v_2$, $u_3$ to $v_3$, and $u_4$ to $v_4$ can be treated as independent.

A user constraint can be considered a point or a region marked in such a way that the seam either does or does not pass through it. The region of inclusion or exclusion may have an arbitrary size denoted by the user or an external program. To find a minimal seam which does pass though a defined region, a pixel location with minimal tree distance from the proper seam tree endpoints can be determined. Constraining a seam to pass through the defined region may be determined by applying weights in such a way that the optimal seam passes through the defined region during calculation. An example of this weighting is to give the defined region a small energy compared to the rest of the pairwise overlap area of the images forming the image mosaic. To find a minimal seam which does not pass though a defined region, a pixel location with minimal tree distance from the proper seam tree endpoints can be determined. Constraining a seam to not pass through the defined region may be determined by applying weights in such a way that the optimal seam does not pass through the defined region during calculation. An example of this weighting is to give the defined region a very large or infinite energy compared to the rest of the pairwise overlap area of the images forming the image mosaic.

Given a collection of n panorama images $I_1, I_2, \ldots, I_n$ and the panorama P, the image boundary problem can be thought of as finding a discrete labeling $L(p) \in (1 \ldots n)$ for all panorama pixels p∈P which minimizes the transition between each image. If $L(p)=k$, this indicates that the pixel value for location p in the panorama comes from image $I_k$. The transition can be defined by an energy on the piecewise smoothness $E_s(p,q)$ of the labeling of neighboring elements p,q∈ $\mathcal{N}$, where $\mathcal{N}$ is the set of all neighboring pixels. Typically, the sum of the energy of all neighbors, E, is minimized. For the panorama boundary problem, this energy can be defined as: $E(L) = \Sigma_{p,q \in \mathcal{N}} E_s(p,q)$.

If minimizing the transition in pixel values:

$$E_s(p,q) = ||I_{L(p)}(p) - I_{L(q)}(p)|| + ||I_{L(p)}(q) - I_{L(q)}(q)||$$

or if minimizing the transition in the gradient:

$$E_s(p,q) = ||\nabla I_{L(p)}(p) - \nabla I_{L(q)}(p)|| + ||\nabla I_{L(p)}(q) - \nabla I_{L(q)}(q)||$$

where L(p) and L(q) are the labeling of the two pixels. Notice that $L(p)=L(q)$ implies that $E_s(p,q)=0$. Minimizing the change in pixel value works well in the context of poor registration or moving objects in the scene, while minimizing the gradient produces a nice input for techniques such as gradient domain blending. In addition, techniques may use a linear combination of the two smoothness energies.

When computing the optimal boundary between two images, the binary labeling may be computed using a min-cut of a graph whose nodes are the pixels and whose arcs connect a pixel to its neighbors. The arc weights are the energy function being minimized. For example, a 4-neighborhood min-cut solution is shown with reference to FIG. 9a with its dual min-path solution shown with reference to FIG. 9b. The min-cut labeling is shown using gradient fill with a first plurality of pixels 800 indicating the first image and a second plurality of pixels 802 indicating the second image. A min-path 804 is shown in FIG. 9b. Thus, there is an equivalent min-path 804 to the min-cut solution shown in FIG. 9a. This has been shown to be true for all single source, single destination paths. Min-path 804 can be computed with a min-path algorithm such as Dijkstra's algorithm described in Dijkstra, E. W. *A note on two problems in connexion with graphs*, Numerische Mathematik 1, 269-271 (1959). Dijkstra's algorithm solves the single-source shortest path problem for a graph with non-negative edge path costs and produces a shortest path tree. The approaches are equivalent in the sense that the final solution of a min-cut calculation defines the pixel labeling as shown in FIG. 9a while the min-path solution defines the path that separates pixels of different labeling as shown in FIG. 9b.

Figures 9A, 9B:
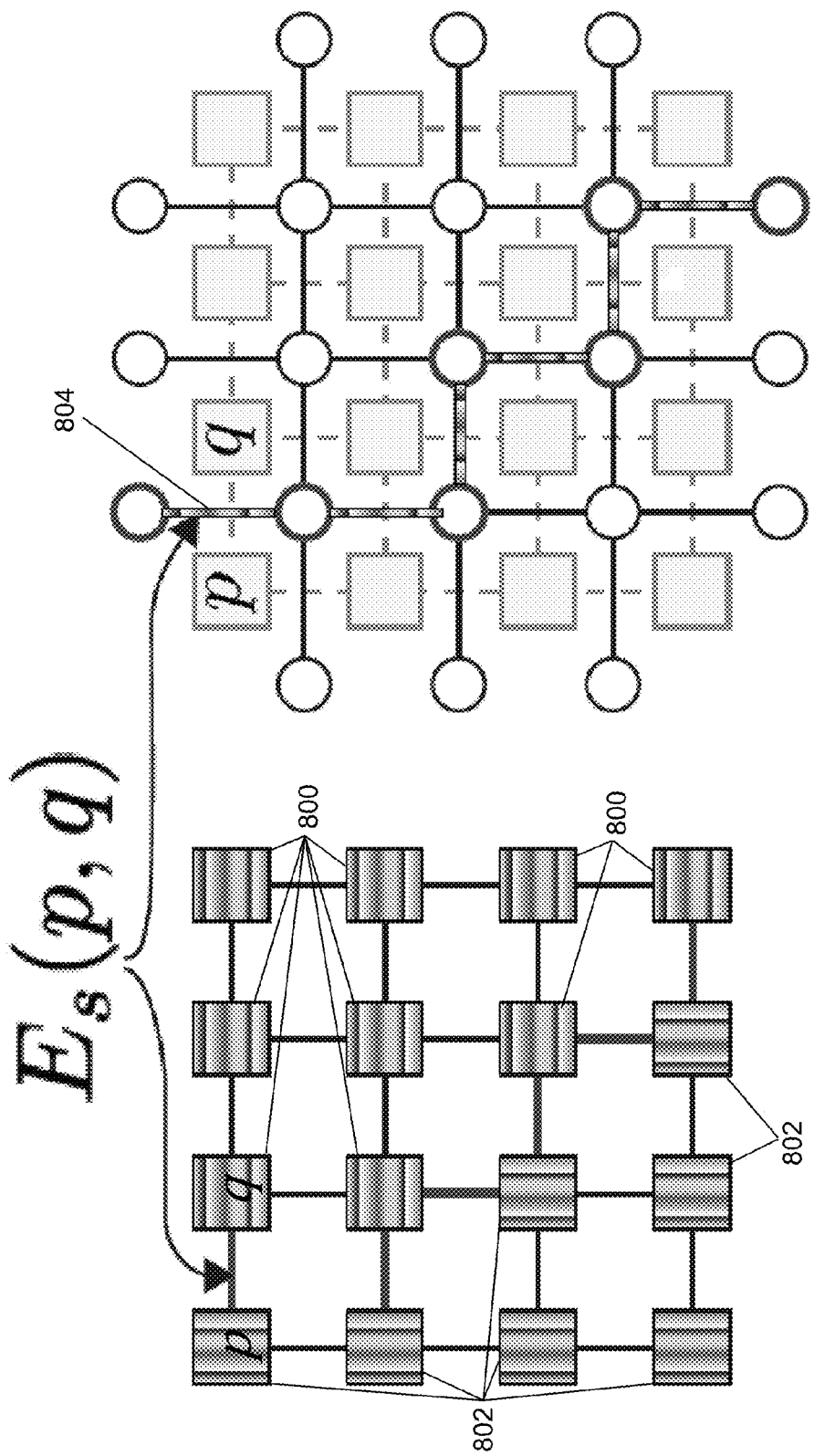
FIGS. 9a and 9b illustrate a min-cut solution and a min-path solution for a seam between a pair of images in accordance with an illustrative embodiment.
Figure 10:
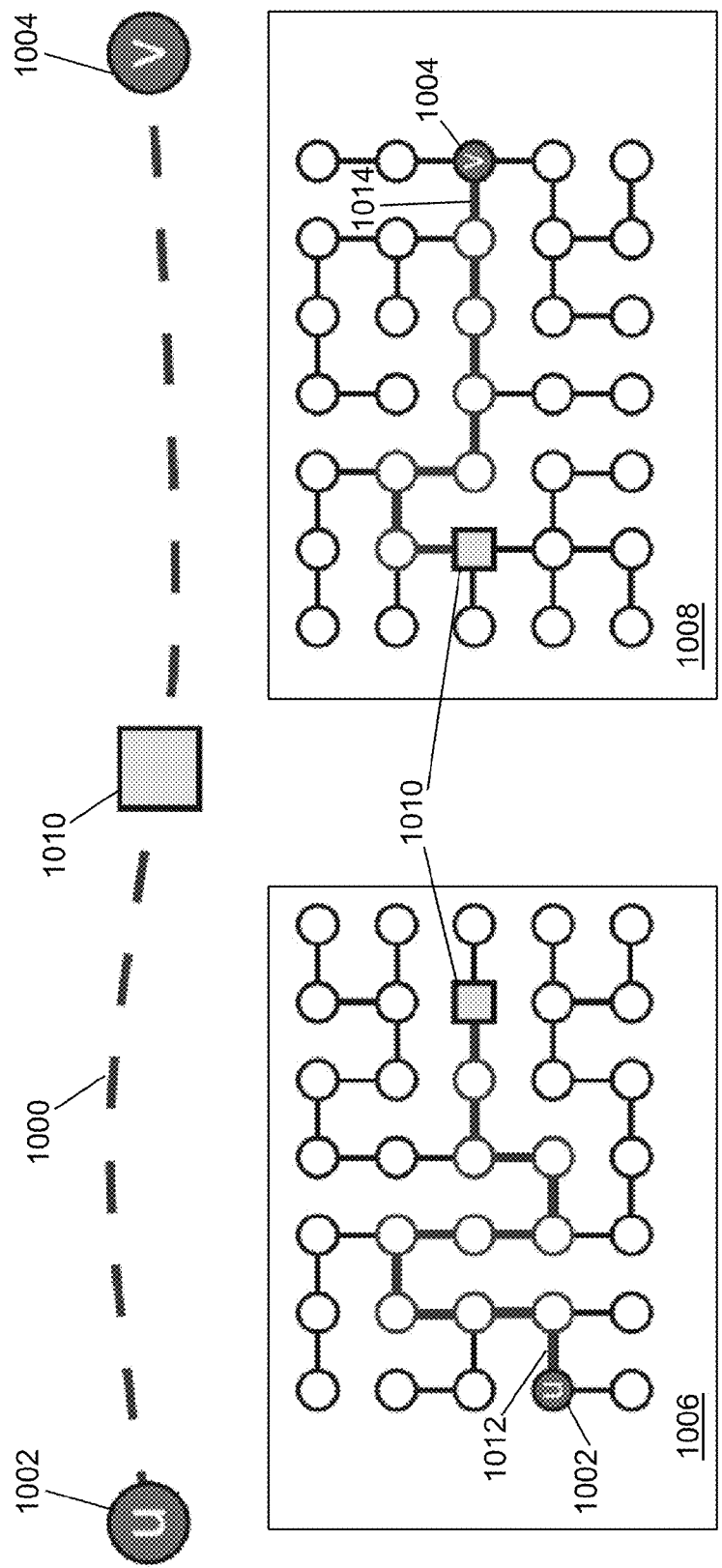
FIG. 10 illustrates two min-path trees in accordance with an illustrative embodiment.

Assuming the dual-path energy representation as shown in FIG. 9b, with reference to FIG. 10, a seam 1000 is a path that connects a first intersection point 1002 to a second intersection point 1004. Computing the minimal path using the determined energy function(s) gives seam 1000, which can be computed efficiently with Dijkstra's algorithm. With minimal additional overhead, a first min-path tree 1006 and a second min-path tree 1008 can be computed from first intersection point 1002 and second intersection point 1004 (single source all paths). First min-path tree 1006 and second min-path tree 1008 provide all minimal seams which originate from either first intersection point 1002 or second intersection point 1004 and define a dual seam tree. As discussed previously, first min-path tree 1006 and second min-path tree 1008 may be stored as two buffers: a node buffer, which encodes the node distance, and a tree buffer, which encodes the tree itself.

Given a point 1010 in the image overlap, a first minimal path 1012 to first intersection point 1002 and a second minimal path 1014 to second intersection point 1004 can be found with a linear walk up of first min-path tree 1006 and second min-path tree 1008, respectively. Thus, given two min-path trees associated with seam endpoints, a new seam that passes through any point (pixel or plurality of pixels defining a region) in the overlap region can be determined using a simple linear walk up each tree starting at the point identified in first min-path tree 1006 and second min-path tree 1008.

If this point is a user constraint, the union of the two minimal paths forms a new constrained optimal seam. Due to the simplicity of the lookup, the new path computation is fast enough to achieve interactive rates even for large image overlaps. Two min-paths on the same energy function are guaranteed not to cross. Given that each dual-seam tree is computed independently though, the paths can cross if there are multiple min-path solutions. This may happen if there are multiple seams which have the same exact energy and the tree computed by Dijkstra's algorithm is dependent on the order in which the edges are calculated. To avoid this problem, an ordering may be enforced based on an edge index to achieve non-crossing solutions.

Moving a constraint (or endpoint) is also a simple walk up its partner endpoint's (or constraint's) seam tree. Therefore, a user can change a constraint or endpoint location at-will, interactively. After the movement, the shifted endpoint's (or constraint's) seam tree is no longer valid because it is based on a previous location. If future interactions are desired, the seam tree is updated based on the moved constraint or endpoint location in operation 718. The seam tree update can be computed as a background process after the user finishes the interaction without any loss of responsiveness by image processing application 224.

Adding a constraint is akin to splitting the seam into segments. Splitting may occur, for example, when a user releases mouse 216 after a bending interaction. After a bending interaction, the seam is split into separate seam structures. Now four seam trees describe the seam instead of the previous two seam trees. Two of the trees (i.e., first min-path tree 1006 and second min-path tree 1008 corresponding to the endpoints) are inherited by the new seams. The two new trees associated with the new constraint are identical; therefore, only one additional tree computation is needed. The new seam tree may also be stored as a node buffer and a tree buffer. The new seam tree provides all minimal seams which originate from the location of the added constraint. Editing may be locked for the seam until the seam trees are updated in operation 718 to include the new seam tree.

Thus, after a user interaction adding a constraint to a seam, a new seam tree is defined in operation 718, and the updated image mosaic is presented in display 218 in operation 720. After a user interaction moving a constraint in a seam, the seam tree associated with the constraint is updated in operation 718, and the updated image mosaic is presented in display 218 in operation 720. Thus, image processing application 224 supports a user's addition of a constraint to a seam and a user's movement of a constraint. The optimal seam which must pass through this new or moved constraint can be computed almost instantly. Thus, the constraint can be moved interactively by the user to explore the seam solution space. Intersections in any adjacency mesh face which contains the corresponding edge are resolved in operation 716. This resolution can be done in parallel. Seams do not change beyond the multi-overlap area in these faces based on the technique to resolve intersections discussed below. Therefore, the seam resolution does not cascade globally.

Pairwise seams can be recombined by computing seam intersections, which are branching points in overlap areas. A determination as to which overlap areas are needed to compute a valid global seam network can be provided by user input or by an external algorithm. For example, for panoramas taken with a robotic tripod head the images lie on a grid. A configuration of valid overlaps given this regular structure can be the vertical and horizontal overlaps between adjacent images on the grid.

Figure 11:
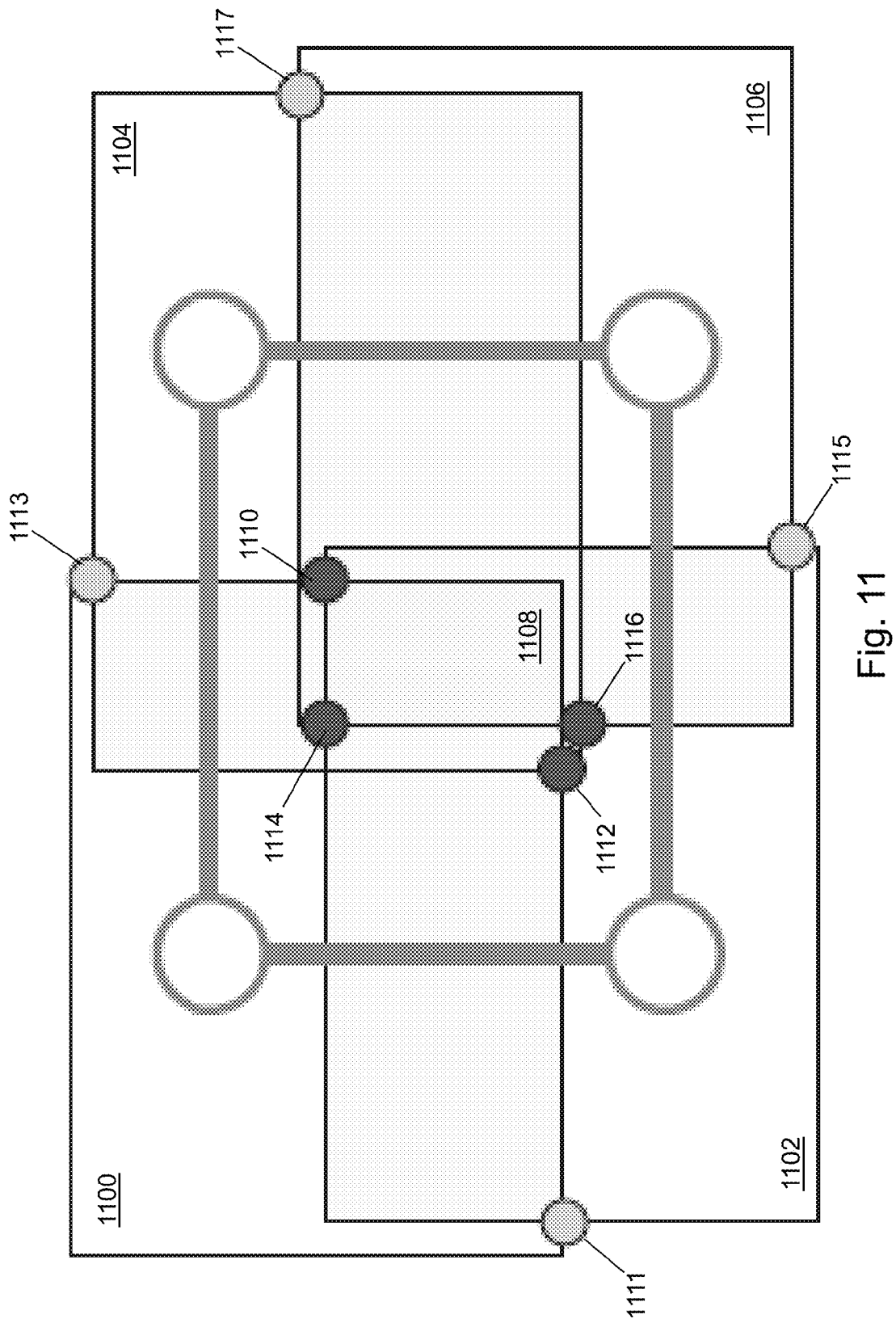
FIGS. 11-14 illustrate a process for determining a branching point in accordance with an illustrative embodiment.

A branching point can be computed by finding the endpoints that are closest, for example, based on a Euclidean distance to the multi-overlap area associated with a respective face of the dual adjacency mesh. Although it is possible to create a pathological overlap configuration where this distance metric fails, this strategy has been shown to work well in practice. As an example, with reference to FIG. 11, a first image 1100, a second image 1102, a third image 1104, and a fourth image 1106 are shown including a multi-overlap area 1108. A first set of intersection endpoints between the images 1100, 1102, 1104, 1106 is defined for multi-overlap area 1108. The first set of intersection endpoints includes a first overlap endpoint 1110 between first image 1100 and second image 1102; a second overlap endpoint 1112 between first image 1100 and third image 1104; a third overlap endpoint 1114 between second image 1102 and fourth image 1106; and a fourth overlap endpoint 1116 between third image 1104 and fourth image 1106. The overlap endpoints are referred to as being inside in relation to multi-overlap area 1108. A second set of intersection endpoints between the images 1100, 1102, 1104, 1106 is defined outside of multi-overlap area 1108. The second set of intersection endpoints includes a first endpoint 1111 between first image 1100 and second image 1102; a second endpoint 1113 between first image 1100 and third image 1104; a third endpoint 1115 between second image 1102 and fourth image 1106; and a fourth endpoint 1117 between third image 1104 and fourth image 1106. These endpoints are referred to as being outside in relation to multi-overlap area 1108.

Figure 12:
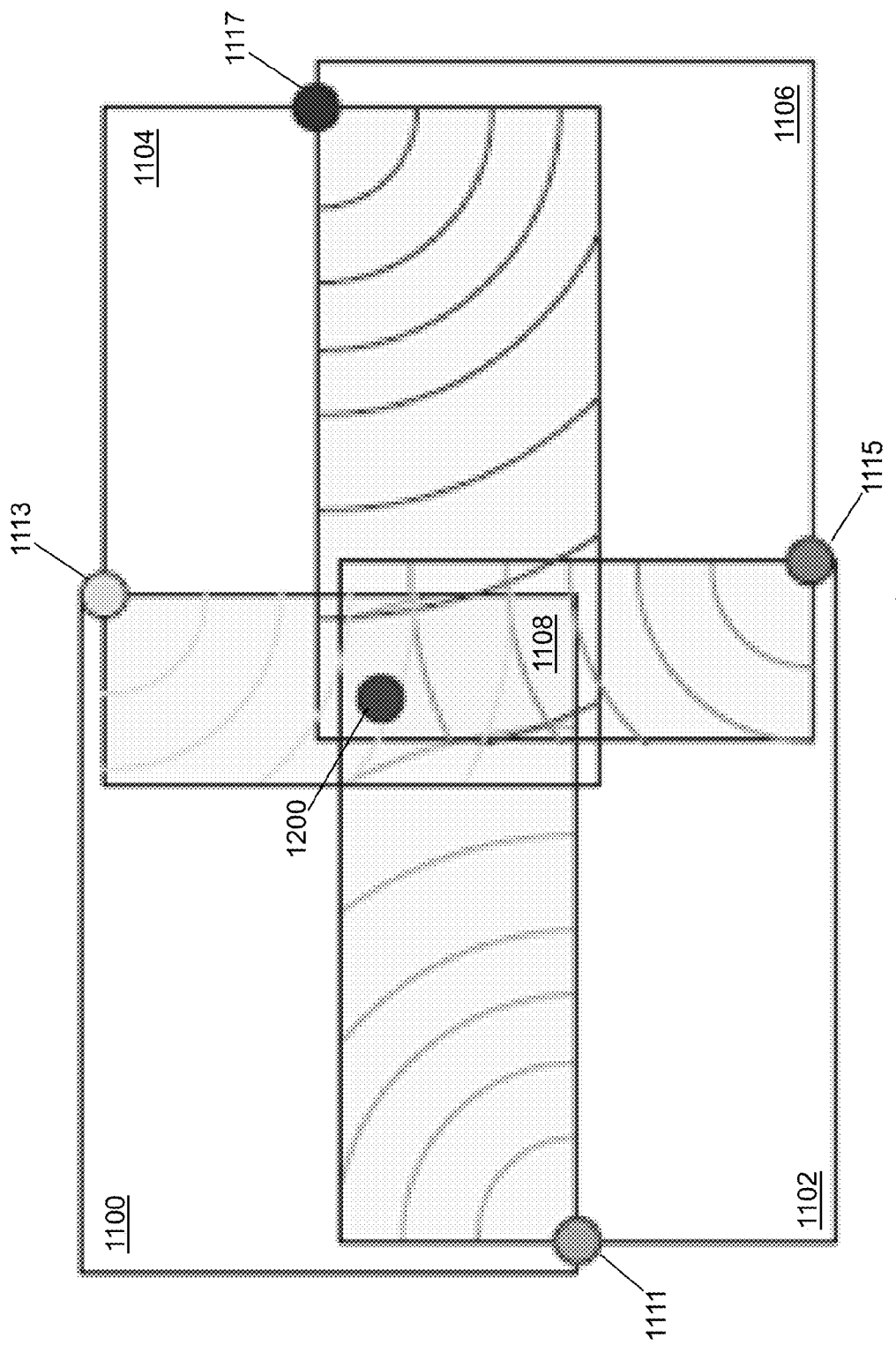

The first set of intersection endpoints is adapted into a branching point. The branching point can be determined by finding a minimum point in the multi-overlap area with respect to min-path distance from the partner endpoints (the second set of intersection endpoints, respectively). For example, with reference to FIG. 12, a branching point 1200 is calculated by finding a minimum point in multi-overlap area 1108 with respect to min-path distance from first overlap endpoint 1110 to first endpoint 1111, from second overlap endpoint 1112 to second endpoint 1113, from third overlap endpoint 1114 to third endpoint 1115, and from fourth overlap endpoint 1116 to fourth endpoint 1117. If dual seam tree distances are used, i.e. the path distance values associated with the second set of intersection endpoints, branching point 1200 can be computed such that it is optimal with respect to the four paths. For example, the distance values can be obtained by a simple lookup in the overlap point node buffers discussed previously. Branching point 1200 may be determined by minimizing a sum of a squared distance for each seam (i.e., first overlap endpoint 1110 to first endpoint 1111, second overlap endpoint 1112 to second endpoint 1113, third overlap endpoint 1114 to third endpoint 1115, and fourth overlap endpoint 1116 to fourth endpoint 1117).

Figure 13:
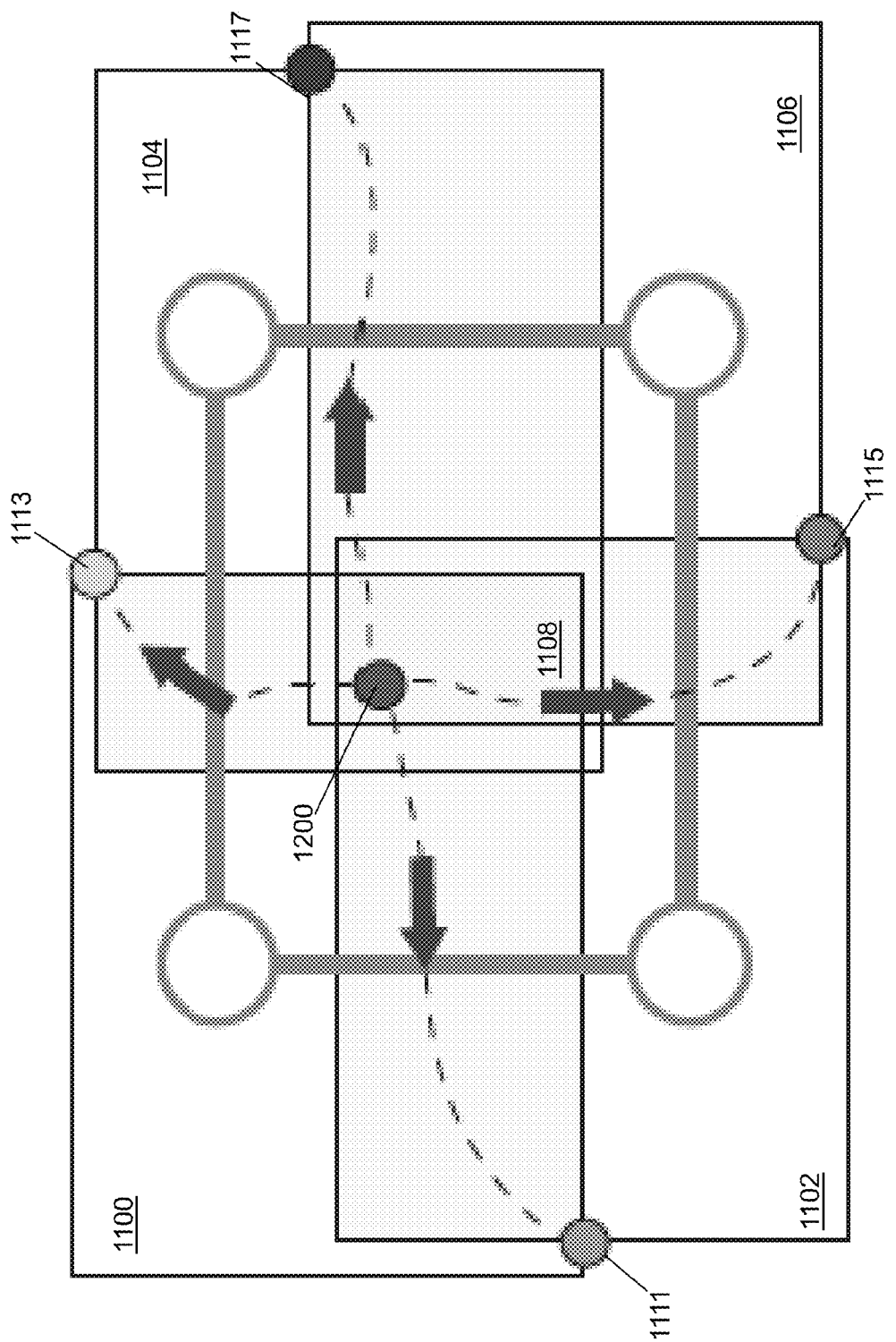

After branching point 1200 is found, the new seams may be computed by a linear lookup up the partner endpoint's (i.e., first endpoint 1111, second endpoint 1113, third endpoint 1115, and fourth endpoint 1117) corresponding seam tree as shown with reference to FIG. 13 and described previously with reference to FIG. 10. Thus, the seam tree associated with the adjusted endpoint based on the branching point definition is recalculated or updated in operation 714 given the new root location defined by branching point 1200. Similarly, in operation 718, a branching point movement detected in operation 728 results in an update to seam tree(s) defined based on the branching point given the movement detected.

Figure 14:
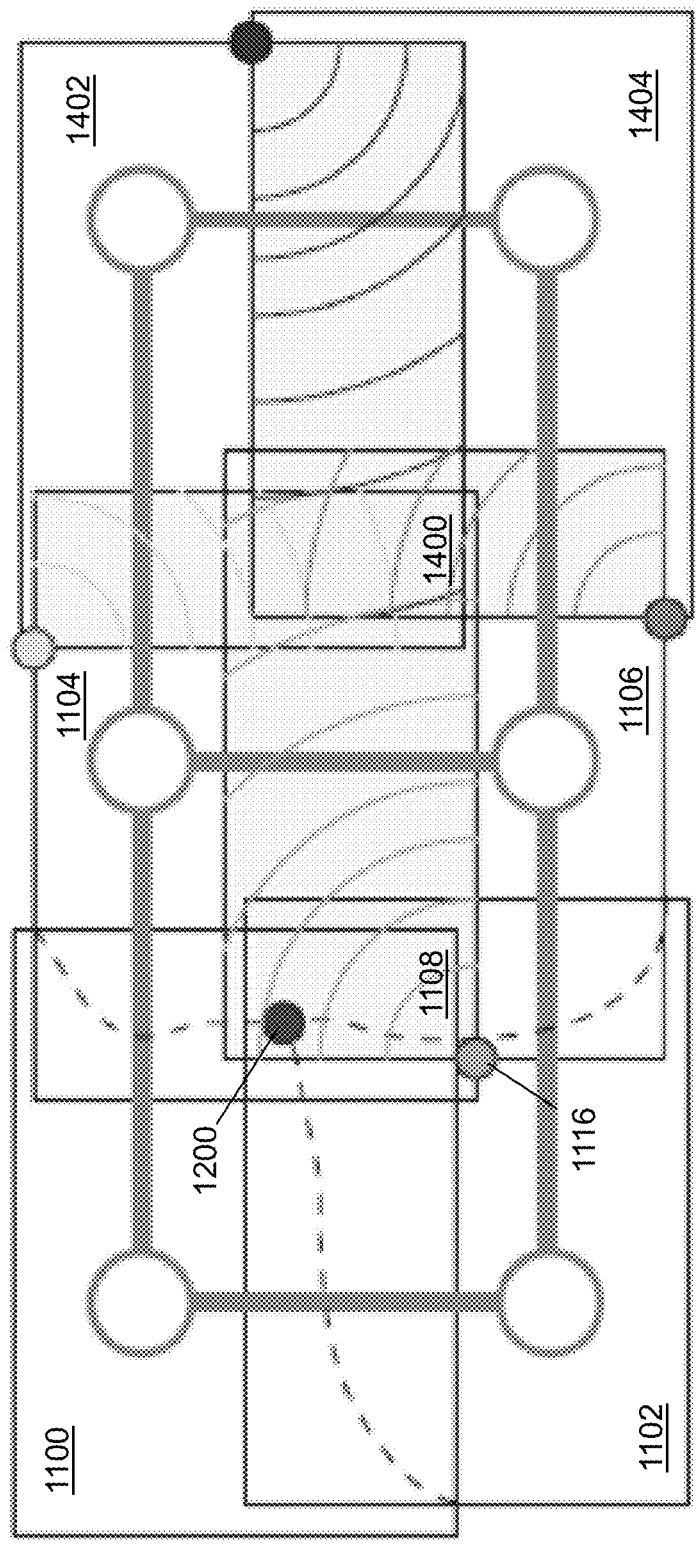

In practice, the contribution of the root location has been found to have a minimal affect on the overall structure of the seam tree as the leaves of the seam tree are approached. To enable parallel computation, each branching point may be computed using an initial endpoint location even if the endpoint is moved via another branching point calculation. For example, as shown with reference to FIG. 14, fourth overlap endpoint 1116 is used to compute a branching point for a second multi-overlap area 1400 between third image 1104, fourth image 1106, a fifth image 1402, and a sixth image 1404, instead of branching point 1200. Thus, since using the initial starting endpoints allows the branching points to be computed independently and in a single parallel pass, redefining the seam trees after movement of a branching point may apply this approach. The seams may be combined sequentially in the same manner as the technique described in A. A. Efros, & W. T. Freeman, *Image quilting for texture synthesis and transfer*, SIGGRAPH, 341-346 (2001).

Figures 15, 16:
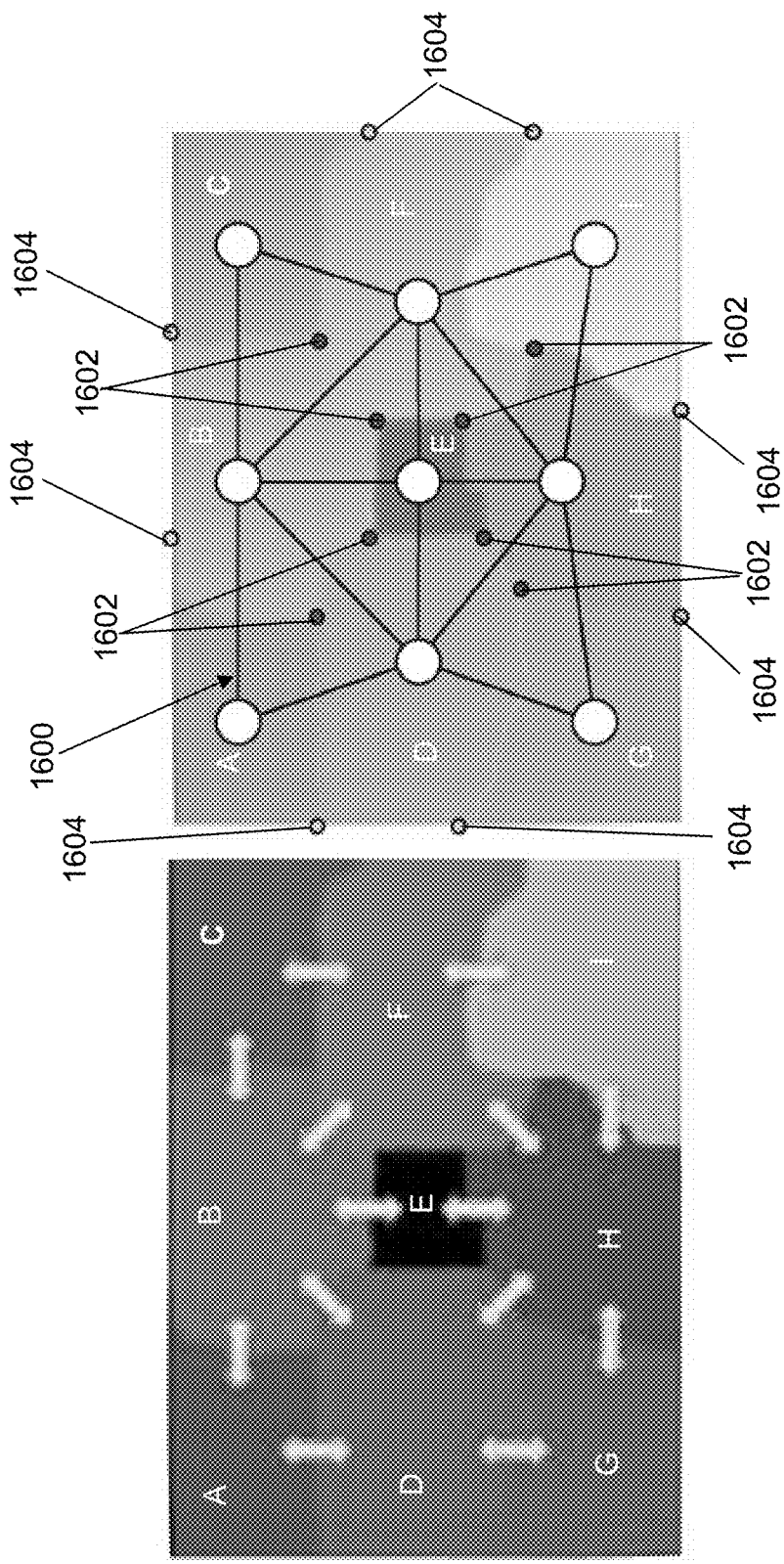
FIG. 15 illustrates a network of pairwise boundaries between a plurality of images in accordance with an illustrative embodiment.
FIG. 16 illustrates an adjacency mesh representation for the pairwise boundaries of FIG. 15 in accordance with an illustrative embodiment.

With reference to FIG. 15, a solution to the panorama boundary problem can be considered as a network of pairwise boundaries between images A-I. With reference to FIG. 16, a dual adjacency mesh 1600 is shown for the images A-I of FIG. 15 in accordance with an illustrative embodiment for a global, Graph Cuts computation. Dual adjacency mesh 1600 can be considered the dual to the seam network of FIG. 15 where each node corresponds to an image in the panorama and each edge describes an overlap relation between images. Edges are orthogonal to the seam they represent. If we consider dual adjacency mesh 1600 as having the structure of a mesh, the dual of the panorama branching points are the faces of this mesh representation. Branching points 1602 are defined for the multi-overlap areas. Seams that exit dual adjacency mesh 1600 correspond to pairwise overlaps on the panorama boundary. External endpoints 1604 are defined for the exiting seams. Connecting the branching points on adjacent faces in dual adjacency mesh 1600 and/or external endpoints 1604 provides a consistent global seam network of pairwise image boundaries.

Figure 17C:
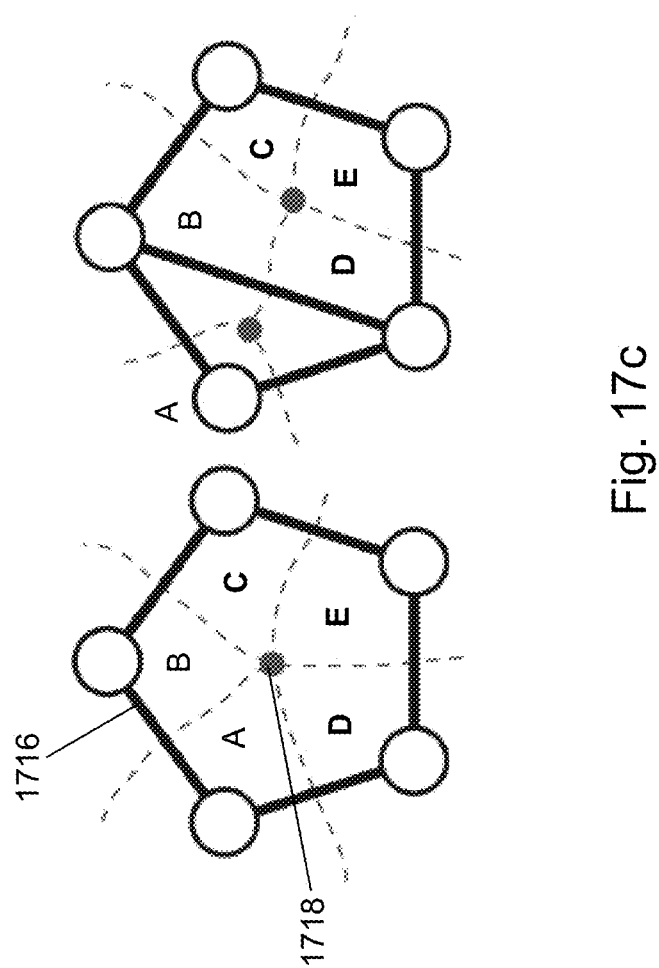
FIG. 17c illustrates a five image overlap adjacency mesh representation with an illustrative valid mesh subdivision in accordance with an illustrative embodiment.

In addition to branching points 1602, the faces of dual adjacency mesh 1600 are also an intuitive representation for multi-overlap areas. The simplest multi-overlap beyond the pairwise case consists of three overlaps and may be represented by a triangle 1700 as shown with reference to FIG. 17*a* in accordance with an illustrative embodiment. Triangle 1700 is defined about a first branching point 1702 that coincides with an overlap of three images A-C. A multi-overlap with four pairwise overlaps, can be represented by a quadrilateral, indicating that all four pairwise seams branch at a mutual point. An important property of this representation is that the quadrilateral can be split into two triangles, a classic subdivision. For example, with reference to FIG. 17*b* a quadrilateral 1704 is defined about a second branching point 1706 that coincides with an overlap of four images A-D. Quadrilateral 1704 can be subdivided by joining nodes A and D to form a first triangle 1708 and a second triangle 1710. As another option, quadrilateral 1704 can be subdivided by joining nodes B and C to form a third triangle 1712 and a fourth triangle 1714. Branching points are defined for each triangle defined. Any valid (no edges crossing) subdivision of a polygon in this mesh results in a valid seam configuration. In this way, the representation can handle a wide range of seam combinations, but keep the overall network consistent. For example, with reference to FIG. 17*c* a pentagon 1716 is defined about a third branching point 1718 that coincides with an overlap of five images A-E.

Figure 18B:
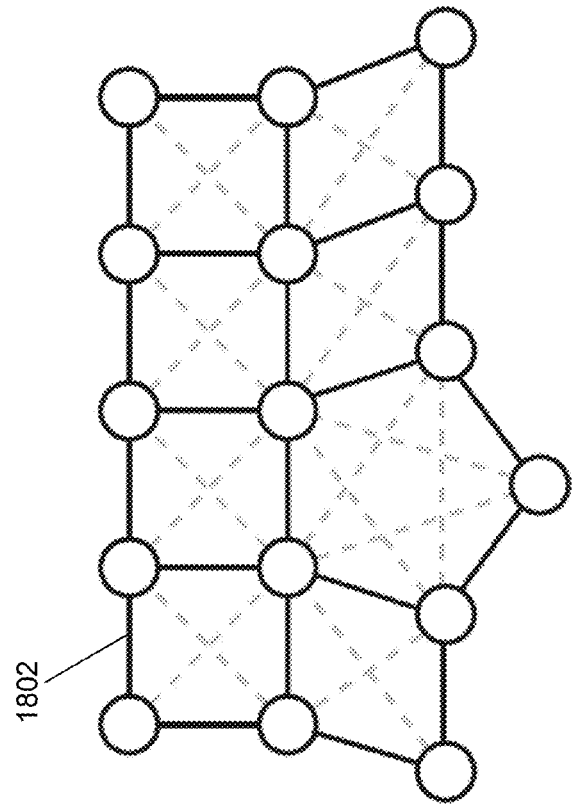
FIG. 18b illustrates an initial valid adjacency mesh representation between the plurality of images of FIG. 18a in accordance with an illustrative embodiment.
Figure 18A:
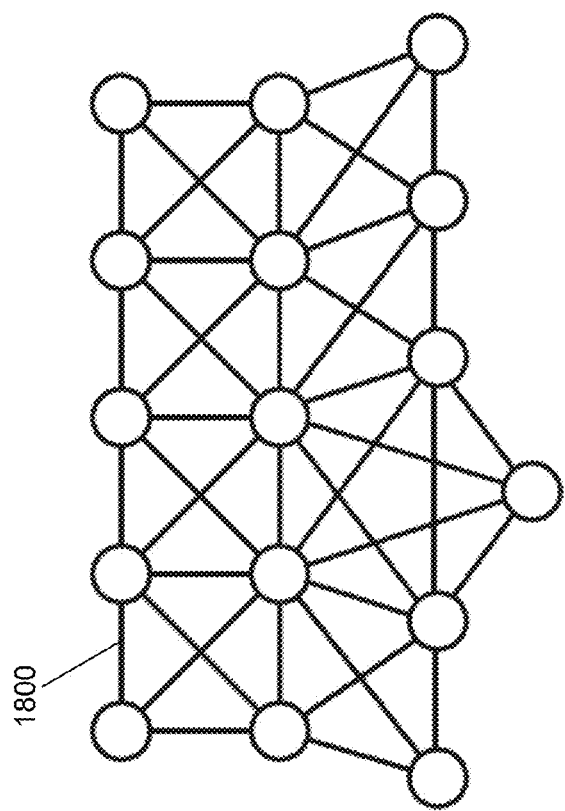
FIG. 18a illustrates a neighborhood graph between a plurality of images in accordance with an illustrative embodiment.

For a general case, as a pre-computation, an initial adjacency mesh 1800 consisting of simple n-gon face representations for every n-way cluster are calculated with reference to FIG. 18*a*. Clusters (and their corresponding multi-overlap areas) by definition are non-overlapping, maximal cliques of the full neighborhood graph. For most panoramas, the neighborhood graph is small enough that a brute-force search can be computed quickly. After the maximal cliques have been found, each n-gon face may be extracted by finding the fully spanning cycle of clique vertices on the boundary in relation to the centroids of the images. The boundary edges of the n-gon face are marked as active, while the interior (intersecting) edges are marked as inactive by dashed lines as shown with reference to FIG. 18*b*. The resulting adjacency mesh 1802 is used for computations and combination of the pairwise boundaries as well as user manipulation of the image mosaic.

In the presence of two adjacent faces in an adjacency mesh, their shared seam is updated in-turn using a mutex flag. As a final phase, each adjacency mesh face resolves intersections in parallel. In order to compute these resolutions in parallel, a seam's data may be split into three separate structures for the beginning, the middle, and the end of the seam. The middle seam contains the original seam before intersection resolution, and its beginning and end are maintained by pointers. The beginning and end structures are updated with the intersection resolution seams by the faces associated with their respective branching points. Either vector is associated with only one face to avoid the risk of multiple threads writing to the same data.

Thus, image processing application 224 supports a user's ability to grab and move a branching point associated with a selected face of the adjacency mesh. As discussed previously, a movement of an endpoint is a simple lookup on its partner's dual seam tree. As the user moves a branching point, intersections for both the selected face and all adjacent faces are resolved.

Given a collection of seam trees which correspond to active edges in the adjacency mesh, the seams can be combined into a global seam network. To do this, the branching points which correspond to each adjacency mesh face are computed in operation 712, the seams are adjusted and seam trees updated in operation 714 given a possible new endpoint, and any invalid intersections that may arise are resolved in operation 716.

Since each seam is computed using a separate energy function, seam-to-seam intersections beyond the branching points are possible. Small intersections of this type may be allowed to ensure that solutions are computable in a 4-neighborhood configuration. For example, there would be no nonintersecting way to combined 5-seams into a single branching point. This allowance is defined by a small neighborhood around the branching point, which can be defined by the user, for example, as a user input. An intersection neighborhood of 1 or 2 pixels has been found to provide good results with no visible artifacts from the intersection. The intersections in this neighborhood may be collapsed to be co-linear to the shortest of the intersecting paths. Intersections that occur outside of this neighborhood may be resolved due to the inconsistent pixel labeling that they imply.

Figure 19A:
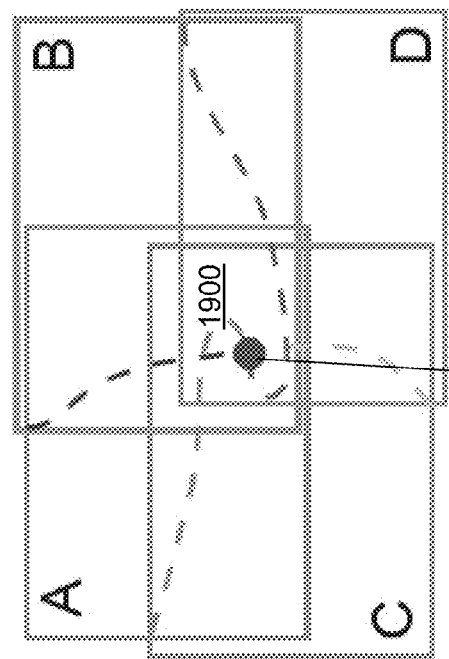
FIG. 19a illustrates an invalid intersection in a multi-overlap area between a plurality of images in accordance with an illustrative embodiment.
Figure 19B:
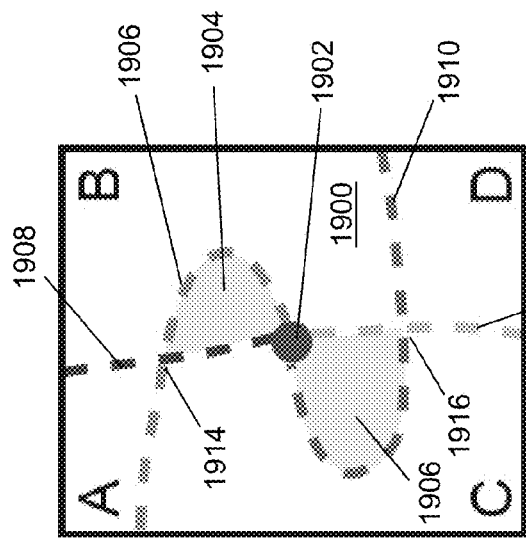
FIG. 19b illustrates a zoomed view of the invalid intersection of FIG. 19a in accordance with an illustrative embodiment.

For example, with reference to FIGS. 19*a* and 19*b*, an example of intersections in an image overlap area 1900 between images A-D are shown. A branching point 1902 is defined for image overlap area 1900. Image overlap area 1900 includes a first conflict area 1904 and a second conflict area 1906, which have conflicting image assignments. First conflict area 1904 is defined by a first seam 1906 and a second seam 1908, which cross at a first intersection point 1914. Second conflict area 1906 is defined by a third seam 1910 and a fourth seam 1912, which cross at a second intersection point 1916. Enforcing no intersections at the time of the seam computation complicates parallelism and may be overly expensive computationally. A simple solution to the problem is to choose one assignment per conflict area. This is equivalent to collapsing the area and making each seam co-linear at points where the seams cross. For example, first seam 1906 could be collapsed into second seam 1908 between first intersection point 1914 and branching point 1902. However, each collapse introduces a new image boundary for which the wrong energy function has been minimized.

Alternatively, for a given pair of intersecting seams (i.e., first seam 1906 and second seam 1908; third seam 1910 and fourth seam 1912), multiple intersections can be resolved by only taking into account the furthest intersection from the branching point in terms of distance on the seam. In addition, given that each seam divides the domain, this intersection can only occur between seams that divide a common image. Now, if presented with a seam-to-seam intersection, the new boundary, which is introduced during the collapse, can be easily computed. This is simply a resolution seam on an overlap between the images which are not common between the intersecting seams 1906, 1908, 1910, 1912. The resolution seams connect the intersection points 1914, 1916 with branching point 1902. Often, if multiple resolution seams share the same overlap, as in FIG. 19*a*, only one min-path calculation from the branching point is needed to fill in all min-paths. The new resolution seams are constrained by the other seams in the cluster in order to not introduce new intersections with the new paths. The constraints are also given the ability to gradually increase the allowed intersection neighborhood beyond the user defined neighborhood if no solution path is present. The crossings and intersections are collapsed in this neighborhood. Though this is a rare occurrence, it should be included for robustness.

Figure 19C:
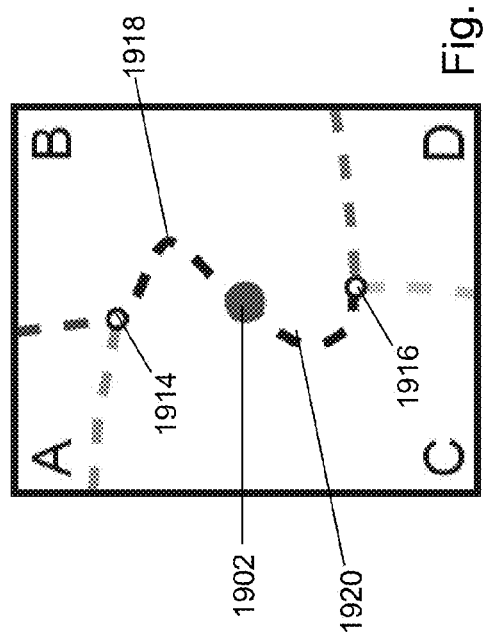
FIG. 19c illustrates a resolved seam for the invalid intersection of FIG. 19a in accordance with an illustrative embodiment.

Order matters in both finding the intersections and computing the resolution seams and therefore should be consistent. Ordering based on the overlap size has been shown to work well in practice. With reference to FIG. 19*c*, an intersection resolution for the conflicting first conflict area 1902 and for second conflict area 1904 is shown. First seam 1906 and second seam 1908 are resolved to form a first resolved seam 1918 that passes through first intersection point 1914 and branching point 1908. Third seam 1910 and fourth seam 1912 are resolved to form a second resolved seam 1920 that passes through second intersection point 1916 and branching point 1908. The new intersections and expanded neighborhood may be hidden from the user and considered to be temporary states.

This technique robustly handles possible seam intersections at the branching points. Additionally, only the seam from the intersection point on is adjusted, each adjacency mesh face can be computed in parallel. In addition, since the seam is not changed outside of the multi-overlap area within a cluster, the resolution is very local and does not cascade to a global resolution.

Given the described intersection resolution technique, only the 1-face neighborhood is examined. Therefore, the updated seams are local. After movement, to enable further interaction, the seam trees associated with the moved branching point are redefined and the updated image mosaic presented in display 218. When the user releases mouse 216, the seam tree data for all the points associated with the active seams for the face are recomputed as a background process in parallel. Like splitting, editing may be locked for each seam until the seam tree update is completed.

The user can add and remove additional panorama seams by splitting and merging branching points. Consistent addition and removal of seams is equivalent to subdividing and merging faces of the adjacency mesh. Improper requests for a subdivision or merge correlate to a non-consistent seam network and therefore may be restricted. If splitting is possible for a selected branching point, the user can iterate and choose from all possible subdivisions of the corresponding face. To maintain consistent seams, merging may only be possible between branching points resulting from a previous split. In other words, merging faces associated with different faces in the initial adjacency mesh may lead to an invalid seam configuration since the corresponding images do not overlap. If a seam is added, its dual seam tree is computed. In addition, the other active seams associated with this face need to be updated much like a branching point movement.

Given the editing freedom allowed to the user, the ues may move a seam into a non-consistent configuration. Rather than constrain the user, an attempt is made to resolve the improper seams or, if that is not possible, the user may be provided visual feedback indicating a problem configuration.

Since the seam tree computations do not cascade globally, it is possible to import a seam network computed using an alternative technique such as the Graph Cuts algorithm. Given a labeling of the pixels of the panorama, image processing application 224 extracts the boundaries of the regions. Branching points (boundary intersections) are also extracted. Each boundary segment (bounded by two branching points) is identified as a seam, and the connected components of the resulting seam network are identified. In an illustrative embodiment, only the seam networks made of a single connected component may be imported. Thus, the biggest connected component of the network may be considered and small islands discarded. Seam data-structures are initialized with the content read from the input file that defines the seam network, and the adjacency mesh is updated if necessary.

Figure 20:
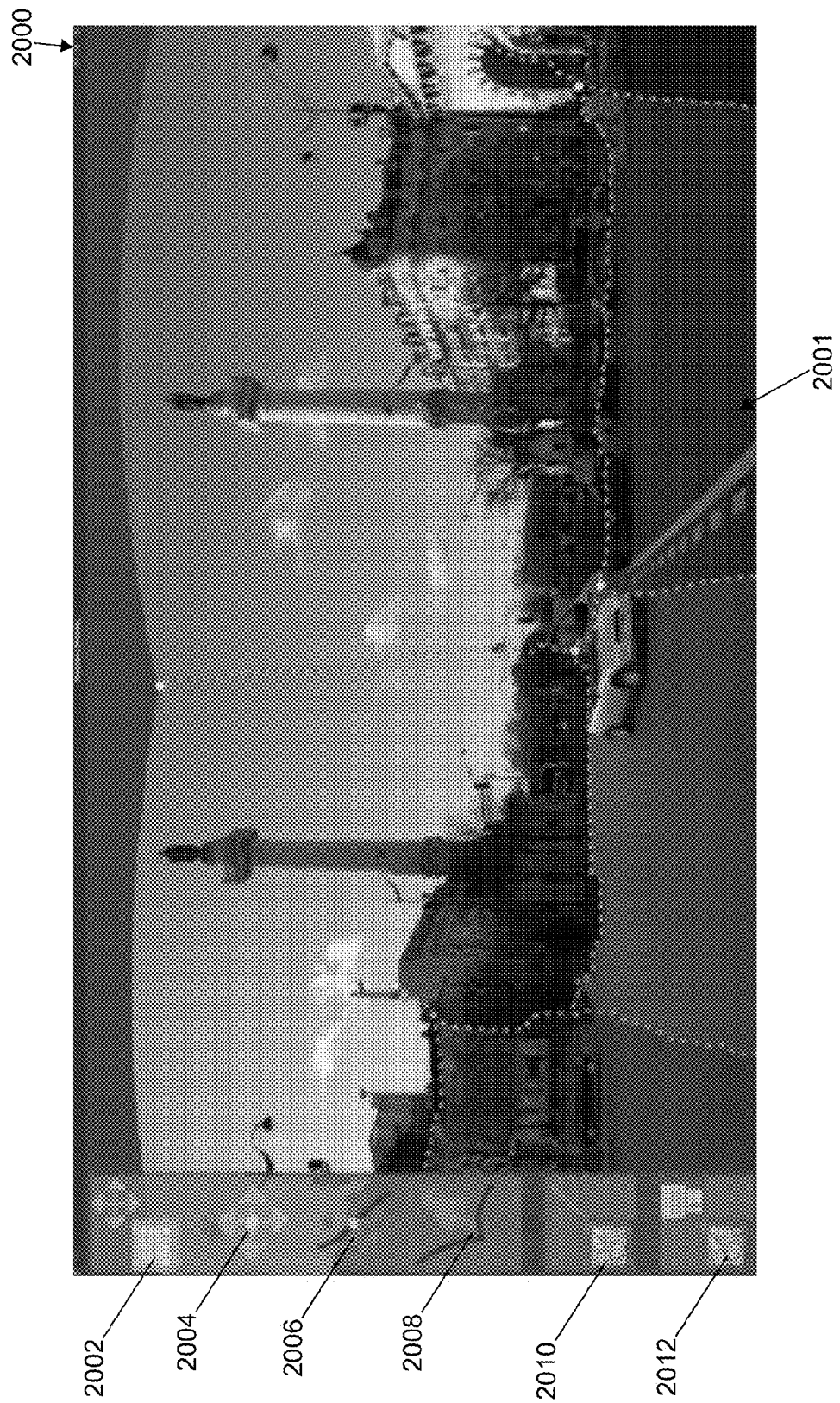
FIGS. 20-22 illustrate user interface windows presented under control of the image processing application of the image processing computing device of FIG. 2 in accordance with an illustrative embodiment.

With reference to FIG. 20, a portion of a first user interface window 2000 is shown in accordance with an example embodiment after the user executes image processing application 224. First user interface window 2000 presents a first image mosaic 2001 composed of nine images. Relative to the nine images there were moving objects during acquisition of the images, registration issues between the images, and a varying exposure between the images. First user interface window 2000 further includes a movement category button 2002, a branching point movement button 2004, a user constraint movement button 2006, a user constraint repetition button 2008, an add/remove category button 2010, and an input/output (I/O) category button 2012.

Movement category button 2002 represents a movement category of buttons, add/remove category button 2010 represents an add/remove category of buttons, and I/O category button 2012 represents an I/O category of buttons. Movement category button 2002 acts as a folder that contains branching point movement button 2004, user constraint movement button 2006, and user constraint repetition button 2008. Thus, selection of movement category button 2002 causes branching point movement button 2004, user constraint movement button 2006, and user constraint repetition button 2008 to be displayed and a subsequent selection of movement category button 2002 causes branching point movement button 2004, user constraint movement button 2006, and user constraint repetition button 2008 to not be displayed.

Selection of branching point movement button 2004 allows the user to select and drag a branching point included in one or more seams of first image mosaic 2001. Selection of user constraint movement button 2006 allows the user to select and drag a constraint point included in one or more seams of first image mosaic 2001. Selection of user constraint repetition button 2008 allows the user to repeatedly add user constraint points using mouse 216. The resulting new seam may be presented to the user automatically in display 218 based on a position of mouse 216 and calculation of a "seam split" performed when the user clicks mouse 216 as discussed previously.

Figure 21:
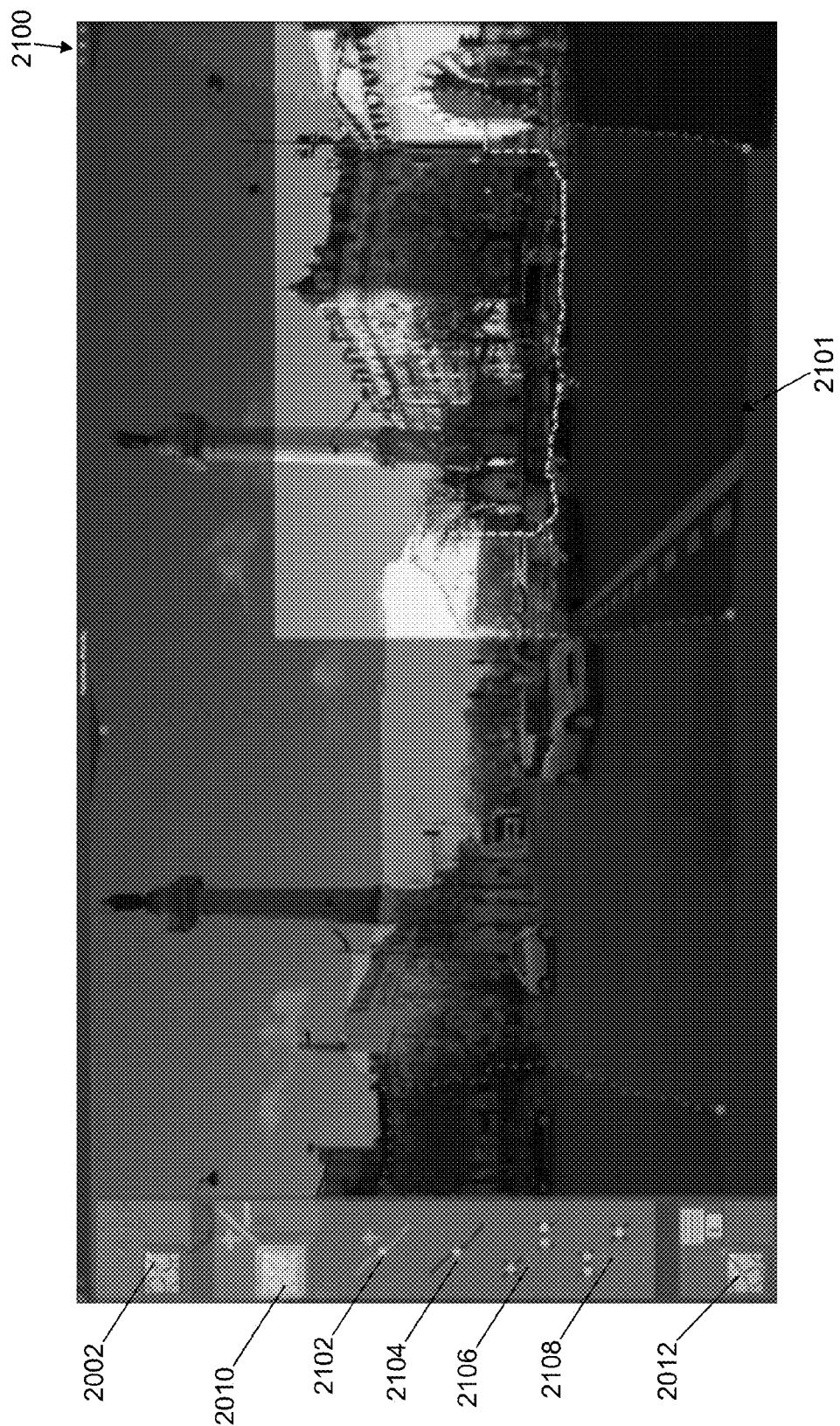

With reference to FIG. 21, a portion of a second user interface window 2100 is shown in accordance with an example embodiment after the user continues to interact with first user interface window 2000. Second user interface window 1600 presents the nine images included in first image mosaic 2001 as a second image mosaic 2101 after further interaction by the user using one or more of the controls of movement category button 2002 and/or add/remove category button 2010. Second user interface window 2100 includes an add user constraint button 2102, a remove user constraint button 2104, an add branching point button 2106, and a remove branching point button 2108. Add/remove category button 2010 acts as a folder that contains add user constraint button 2102, remove user constraint button 2104, add branching point button 2106, and remove branching point button 2108. Thus, selection of add/remove category button 2010 causes add user constraint button 2102, remove user constraint button 2104, add branching point button 2106, and remove branching point button 2108 to be displayed and a subsequent selection of add/remove category button 2010 causes add user constraint button 2102, remove user constraint button 2104, add branching point button 2106, and remove branching point button 2108 to not be displayed.

Selection of add user constraint button 2102 allows the user to add a constraint point to second image mosaic 2101. Selection of remove user constraint button 2104 allows the user to remove a constraint point from second image mosaic 2101. Selection of add branching point button 2102 allows the user to add a branching point to second image mosaic 2101. Selection of remove branching point button 2104 allows the user to remove a branching point from second image mosaic 2101.

Figure 22:

With reference to FIG. 22, a portion of a third user interface window 2200 is shown in accordance with an example embodiment after the user continues to interact with first user interface window 2000. Third user interface window 2200 presents the nine images included in first image mosaic 2001 as a third image mosaic 2201 that has been zoomed to show additional details of a portion of the nine images after further interaction by the user using one or more of the controls of movement category button 2002 and/or add/remove category button 2010. Third user interface window 2200 includes a load seams button 2202 and a save seams button 2204. I/O category button 2012 acts as a folder that contains load seams button 2202 and save seams button 2204. Thus, selection of I/O category button 2012 causes load seams button 2202 and save seams button 2204 to be displayed and a subsequent selection of I/O category button 2012 causes load seams button 2202 and save seams button 2204 to not be displayed.

Selection of load seams button 2202 allows the user to load seams for third image mosaic 2201. Thus, in an illustrative embodiment, the seams can be saved and reloaded for future editing. The seams can be saved as a labeling of pixels, where the color value denotes the image that provides the pixel in the image mosaic. An additional file may store the mapping of colors to image files. Additionally or in the alternative, each seam's geometry may be directly saved as integer (x, y) coordinates. Selection of save seams button 2204 triggers saving of the currently calculated seams for third image mosaic 2201.

Figure 23A:
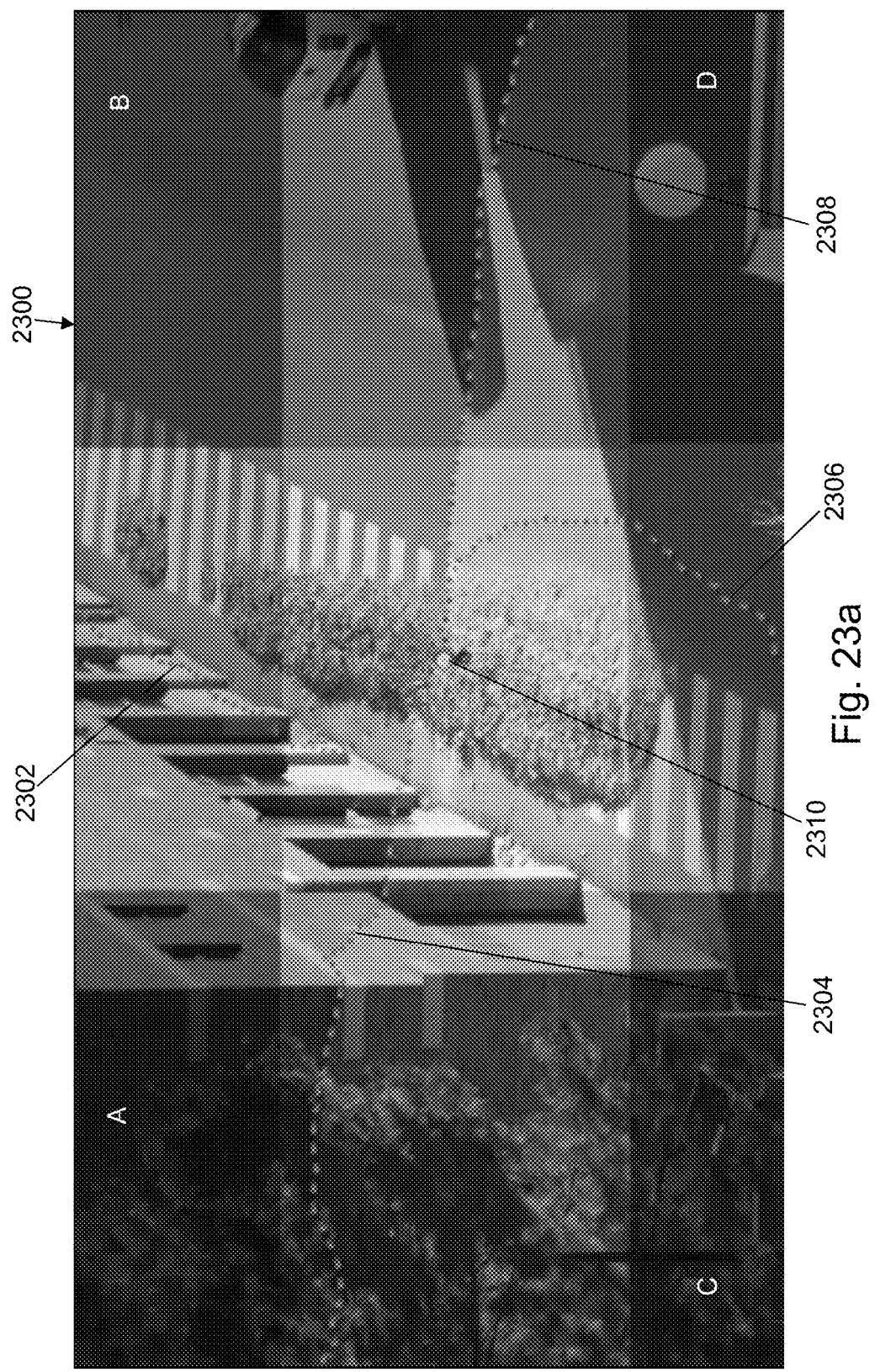
FIGS. 23a-23b illustrate user interface windows showing a result of seam interactions by a user presented under control of the image processing application of the image processing computing device of FIG. 2 in accordance with an illustrative embodiment.

With reference to FIG. 23a, an image mosaic 2300 is shown in accordance with an illustrative embodiment. Image mosaic 2300 is formed from four images A-D. A first seam 2302 is defined between images A and B. A second seam 2304 is defined between images A and C. A third seam 2306 is defined between images C and D. A fourth seam 2308 is defined between images B and D. A branching point 2310 is defined between images A-D.

Figure 23B:
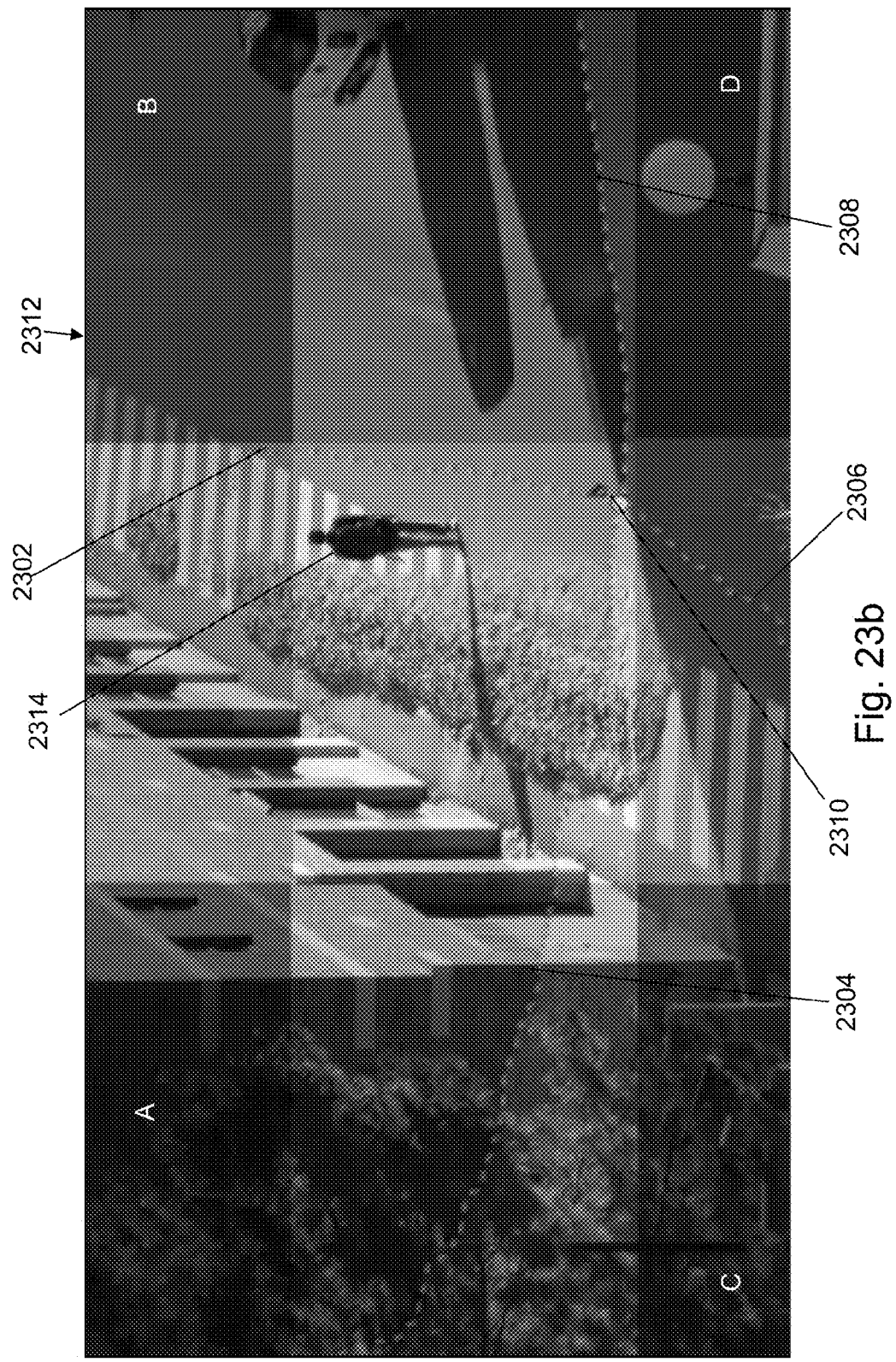

With reference to FIG. 23b, a second image mosaic 2312 is shown in accordance with an illustrative embodiment after the user selects and drags branching point 2310 to a second location. While second image mosaic 2312 is formed from the same four images A-D as image mosaic 2300, the seams between the images has been changed resulting in a FIG. 2314 that was previously not visible becoming visible because more of image A is included in second image mosaic 2312.

Figure 24:
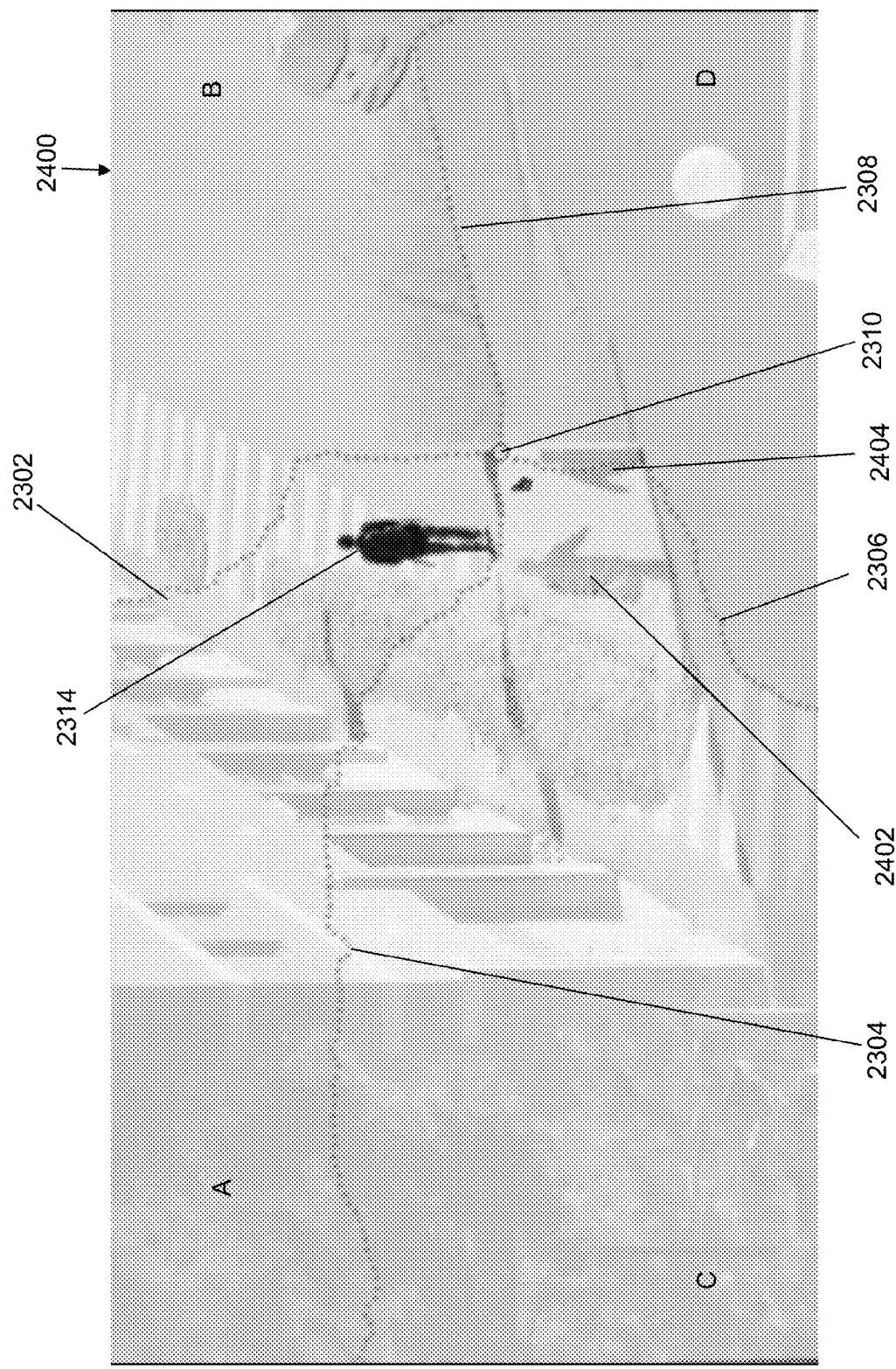
FIG. 24 illustrates a user interface window showing a "suggestion view" presented under control of the image processing application of the image processing computing device of FIG. 2 in accordance with an illustrative embodiment.

With reference to FIG. 24, shows a third image mosaic 2400 presented under control of image processing application 224 in accordance with an illustrative embodiment. While third image mosaic 2400 is formed from the same four images A-D as image mosaic 2300 and second image mosaic 2312, the seams between the images has been changed. More of images A and C have been shown by moving branching point 2310 to a third location. Unlike image mosaic 2300 and second image mosaic 2312, third image mosaic 2400 also shows hidden details of images A-D. Thus, third image mosaic 2400 suggests to the user areas of potential problems for which the user may want to adjust the seams. Third image mosaic 2400 may be generated automatically or at the request of the user, for example, by selecting a button after adjusting branching point 2310.

Third image mosaic 2400 may be generated by covering the image mosaic formed by moving branching point 2310 to the third location (or any other location) with a semi transparent white overlay. For example, let T be a level of transparency of third image mosaic 2400 where 0 is full transparency and 1 is full opacity. In the portions of third image mosaic 2400 where images A-D do not overlap, T is set to a standard value $T_0$, smaller than 1, but greater than 0. For each pixel of third image mosaic 2400 (under the current view such as based on the third location of branching point 2310) included in a multi-overlap area, a maximum luminance absolute difference between pairwise overlaps is computed. For example, if the current pixel p is spanned by images A, B, and C, pA, pB and pC may be defined as the luminance of the pixel in images A, B, and C. An absolute difference between pairs of images is calculated as |pA−pB|, |pA−pC|, and |pB−pC|. An error pE associated with pixel p is pE=max (|pA−pB|, |pA−pC|, and |pB−pC|) or a maximum luminance absolute difference between pairwise overlaps. Error pE is used to determine a local amount of opacity of a white overlay for pixel p, by linear interpolation between 0 and $T_0$, under the parameters pEmax and pEmin, where pEmax is associated with 0 and pEmin is associated with $T_0$ for opacity values. For example, to create third image mosaic 2400, $T_0$=0.75, pEmax=92, and pEmin=16 were used though other values are of course possible.

From a user's point of view, as a final result, the areas of third image mosaic 2400 where important differences exist between images A-D appear very transparent on the white overlay. For instance, as shown wither reference to FIG. 24, a first person silhouette 2402 and a second person silhouette 2404 are visible in the multi-overlap area. This means that two people appear on some of the images of third image mosaic 2400, but not on others. In particular, the two people do not appear on the pixels which have been revealed by the seam computation based on the third location of branching point 2310. Similarly, FIG. 2314 does not appear on some of the images of third image mosaic 2400, though it does on the pixels which have been revealed by the seam computation based on the third location of branching point 2310. A filter may be applied to the opacity layer calculation to provide a smoother result. For example, a gaussian filter may be applied to the opacity layer calculation to provide a smoother result.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A non-transitory computer-readable medium having stored thereon computer-readable instructions that when executed by a computing device cause the computing device to:

read a plurality of image files, wherein the plurality of image files contain image data defining a plurality of overlapping images;

define a dual adjacency mesh for an image mosaic based on an arrangement of the plurality of overlapping images, wherein the dual adjacency mesh is defined as a plurality of nodes and edges that connect a pair of the plurality of nodes, wherein a node is defined for each image of the plurality of overlapping images and an edge is defined between each node of a pair of images of the plurality of overlapping images that overlap, wherein a seam of the image mosaic crosses an edge of the dual adjacency mesh in one-to-one correspondence to define a plurality of seams, wherein each seam is defined between an external endpoint and a branching point or between a pair of branching points, wherein the external endpoint is defined on a boundary of the image mosaic between a pair of overlapping images, wherein the branching point is defined as a minimum point with respect to a min-path distance calculated between at least three nodes of the plurality of nodes; and control presentation of the image mosaic in a display of a first device, wherein the image mosaic is created from the plurality of overlapping images based on the plurality of seams defined from the defined dual adjacency mesh.

2. A system comprising:

a display;

a processor; and a computer-readable medium operably coupled to the processor, the computer-readable medium having computer-readable instructions stored thereon that, when executed by the processor, cause the system to read a plurality of image files, wherein the plurality of image files contain image data defining a plurality of overlapping images;

define a dual adjacency mesh for an image mosaic based on an arrangement of the plurality of overlapping images, wherein the dual adjacency mesh is defined as a plurality of nodes and edges that connect a pair of the plurality of nodes, wherein a node is defined for each image of the plurality of overlapping images and an edge is defined between each node of a pair of images of the plurality of overlapping images that overlap, wherein a seam of the image mosaic crosses an edge of the dual adjacency mesh in one-to-one correspondence to define a plurality of seams, wherein each seam is defined between an external endpoint and a branching point or between a pair of branching points, wherein the external endpoint is defined on a boundary of the image mosaic between a pair of overlapping images, wherein the branching point is defined as a minimum point with respect to a min-path distance calculated between at least three nodes of the plurality of nodes; and control presentation of the image mosaic in the display, wherein the image mosaic is created from the plurality of overlapping images based on the plurality of seams defined from the defined dual adjacency mesh.

3. A method of creating an image mosaic, the method comprising:

reading a plurality of image files at a computing device, wherein the plurality of image files contain image data defining a plurality of overlapping images;

defining, by the computing device, a dual adjacency mesh for an image mosaic based on an arrangement of the plurality of overlapping images, wherein the dual adjacency mesh is defined as a plurality of nodes and edges that connect a pair of the plurality of nodes, wherein a node is defined for each image of the plurality of overlapping images and an edge is defined between each node of a pair of images of the plurality of overlapping images that overlap, wherein a seam of the image mosaic crosses an edge of the dual adjacency mesh in one-to-one correspondence to define a plurality of seams, wherein each seam is defined between an external endpoint and a branching point or between a pair of branching points, wherein the external endpoint is defined on a boundary of the image mosaic between a pair of overlapping images, wherein the branching point is defined as a minimum point with respect to a min-path distance calculated between at least three nodes of the plurality of nodes; and control presentation of the image mosaic in a display of the computing device, wherein the image mosaic is created from the plurality of overlapping images based on the plurality of seams defined from the defined dual adjacency mesh.

4. The non-transitory computer-readable medium of claim 1, wherein a first seam of the plurality of seams includes a plurality of pixels in the image mosaic between a first group of the plurality of overlapping images that together overlap at a group of pixels, wherein on a first side of the first seam a first image from the first group is shown and on a second side of the first seam opposite the first side a second image from the first group is shown and the computer-readable instructions further cause the computing device to control presentation of the first seam in the image mosaic.

5. The non-transitory computer-readable medium of claim 4, wherein the first group is a pair of overlapping images, and locations of the plurality of pixels that form the first seam are determined based on a first independent pair-wise boundary computation between a first overlap point and a second overlap point of the pair of overlapping images.

6. The non-transitory computer-readable medium of claim 5, wherein the locations of the plurality of pixels that form the first seam are further determined based on a second independent pair-wise boundary computation between a third overlap point and a fourth overlap point of the pair of overlapping images.

7. The non-transitory computer-readable medium of claim 5, wherein the computer-readable instructions further cause the computing device to:

receive an indicator of an interaction by a user with the image mosaic presented in the display, wherein the indicator indicates that the user has selected a pixel of the plurality of pixels of the first seam and has moved the selected pixel to a first location within an overlapping region between the pair of overlapping images;

compute a second seam that includes the first location; and control presentation of the image mosaic in the display of the first device, wherein the image mosaic includes the second seam between the pair of overlapping images, and further wherein the second seam replaces at least a portion of the first seam in the image mosaic.

8. The non-transitory computer-readable medium of claim 4, wherein the first group is at least three overlapping images, wherein pairs of the at least three overlapping images cross at a plurality of overlap points, wherein a first plurality of overlap points of the plurality of overlap points are located along an outside edge of the first group and a second plurality of overlap points of the plurality of overlap points are located within the first group, and locations of the plurality of pixels that form the first seam are determined based on a first independent pair-wise boundary computation between a first overlap point of the first plurality of overlap points and the branching point defined based on the second plurality of overlap points.

9. The non-transitory computer-readable medium of claim 8, wherein the branching point is defined as the minimum point with respect to the min-path distance calculated between pairs of the first plurality of overlap points and the second plurality of overlap points associated with the same pair of images of the at least three overlapping images.

10. The non-transitory computer-readable medium of claim 9, wherein the first overlap point is between a first pair of images of the first group, and the first overlap point and the branching point are on opposite sides of the edge defined between the nodes of the first pair of images of the dual adjacency mesh.

11. The non-transitory computer-readable medium of claim 9, wherein a second seam includes a second plurality of pixels in the image mosaic, and locations of the second plurality of pixels that form the second seam are determined based on a second independent pair-wise boundary computation between a second overlap point of the first plurality of overlap points and the branching point and the computer-readable instructions further cause the computing device to control presentation of the second seam in the image mosaic.

12. The non-transitory computer-readable medium of claim 4, wherein a second seam of the plurality of seams includes a second plurality of pixels in the image mosaic between a second group of the plurality of overlapping images that together overlap at a second group of pixels, wherein on a first side of the second seam a first image from the second group is shown and on a second side of the second seam opposite the first side a second image from the second group is shown and the computer-readable instructions further cause the computing device to control presentation of the second seam in the image mosaic.

13. The non-transitory computer-readable medium of claim 12, wherein the first group is at least three overlapping images and the second group is at least three overlapping images, wherein at least two overlapping images of the first group and the second group are the same images, wherein first pairs of the first group cross at a first plurality of overlap points and second pairs of the second group cross at a second plurality of overlap points, and locations of the plurality of pixels that form the second seam are determined based on a first independent pair-wise boundary computation between a first branching point defined based on the first plurality of overlap points and a second branching point defined based on the second plurality of overlap points.

14. The non-transitory computer-readable medium of claim 13, wherein a first plurality of the first plurality of overlap points are located along an outside edge of the first group and a second plurality of the first plurality of overlap points are located within the first group, wherein the first branching point is defined as the minimum point with respect to the min-path distance calculated between pairs of the first plurality of the first plurality of overlap points and the second plurality of the first plurality of overlap points associated with the same pair of images of the first group.

15. The non-transitory computer-readable medium of claim 14, wherein a first plurality of the second plurality of overlap points are located along an outside edge of the second group and a second plurality of the second plurality of overlap points are located within the second group, wherein the second branching point is defined as a second minimum point with respect to a second min-path distance calculated between second pairs of the first plurality of the second plurality of overlap points and the second plurality of the second plurality of overlap points associated with the same pair of images of the second group.

16. The non-transitory computer-readable medium of claim 13, wherein the first branching point and the second branching point are on opposite sides of the edge defined between the nodes of the at least two overlapping images of the first group and the second group that are the same images.

17. The non-transitory computer-readable medium of claim 9, wherein the computer-readable instructions further cause the computing device to:
receive an indicator of an interaction by a user with the image mosaic presented in the display, wherein the indicator indicates that the user has selected the branching point and has moved the selected branching point to a first location within an overlapping region between the at least three overlapping images;
compute a second seam that includes the first location; and
control presentation of the image mosaic in the display of the first device, wherein the image mosaic includes the second seam between the at least three overlapping images, and further wherein the second seam replaces at least a portion of the first seam in the image mosaic.

18. The non-transitory computer-readable medium of claim 17, wherein the first seam is computed using a first seam tree and a second seam tree, wherein the first seam tree is stored as a first node buffer and a first tree buffer, wherein the first node buffer includes a first node distance value for each pixel in the overlapping region to the first overlap point and the first tree buffer includes a first direction value for each pixel in the overlapping region that indicates a first direction of a first connecting pixel in a 4-pixel neighborhood about each pixel in a first path from the first overlap point to the respective pixel, and further wherein the second seam tree is stored as a second node buffer and a second tree buffer, wherein the second node buffer includes a second node distance value for each pixel in the overlapping region to the branching point and the second tree buffer includes a second direction value for each pixel in the overlapping region that indicates a second direction of a second connecting pixel in a 4-pixel neighborhood about each pixel in a second path from the branching point to the respective pixel.

19. The non-transitory computer-readable medium of claim 18, wherein the second seam is computed by identifying a first pixel in the first node buffer associated with the first location and by walking up the first seam tree to the first overlap point from the first pixel using the first node distance value and the first direction value.

20. The non-transitory computer-readable medium of claim 19, wherein the second seam is further computed by identifying a second pixel in the second node buffer associated with the first location and by walking up the second seam tree to the branching point from the second pixel using the second node distance value and the second direction value.

* * * * *